(12) United States Patent
Lundquist et al.

(10) Patent No.: US 11,385,350 B2
(45) Date of Patent: *Jul. 12, 2022

(54) TILTED IMAGE PLANE LIDAR

(71) Applicant: Arete Associates, Longmont, CO (US)

(72) Inventors: Paul B. Lundquist, Longmont, CO (US); Gregory J. Fetzer, Berthoud, CO (US); Richard Vercillo, Tucson, AZ (US); Michael Francis Marnon, Washington, DC (US); Thomas Laurence Kraus, Springfield, VA (US)

(73) Assignee: Arete Associates, Northridge, CA (US)

( * ) Notice: Subject to any disclaimer, the term of this patent is extended or adjusted under 35 U.S.C. 154(b) by 642 days.

This patent is subject to a terminal disclaimer.

(21) Appl. No.: 15/906,818

(22) Filed: Feb. 27, 2018

(65) Prior Publication Data
US 2018/0188367 A1   Jul. 5, 2018

Related U.S. Application Data

(63) Continuation of application No. 14/869,448, filed on Sep. 29, 2015, now Pat. No. 9,910,155.

(51) Int. Cl.
*G01S 17/00* (2020.01)
*G01S 17/08* (2006.01)
*G01S 17/42* (2006.01)
*G01S 7/481* (2006.01)

(52) U.S. Cl.
CPC ......... *G01S 17/003* (2013.01); *G01S 7/4816* (2013.01); *G01S 7/4817* (2013.01); *G01S 17/08* (2013.01); *G01S 17/42* (2013.01)

(58) Field of Classification Search
CPC ...... G01S 7/4816; G01S 17/95; G01S 17/003; G01S 7/4817; G01S 17/08; G01S 17/42; G01N 21/53; G01N 2021/4709; G01N 2021/1793; Y02A 90/19; H01S 5/423; H01S 5/0262; H01S 5/18341; H01S 5/02415; H01S 5/18388; H01S 5/0213; H01S 5/18358; H01S 5/34333; H01S 5/04253; H01S 5/0207; H01S 5/18305; H01S 5/0218; B82Y 20/00;
(Continued)

(56) References Cited

U.S. PATENT DOCUMENTS

| | | |
|---|---|---|
| 8,427,649 B2 | 4/2013 | Hays et al. |
| 9,086,488 B2 * | 7/2015 | Tchoryk, Jr. .......... G01S 17/003 |
| 10,436,907 B1 * | 10/2019 | Murray .................. G01S 17/95 |

(Continued)

*Primary Examiner* — Luke D Ratcliffe
(74) *Attorney, Agent, or Firm* — FisherBroyles, LLP; Gregory T. Fettig

(57) ABSTRACT

Embodiments herein provide for improved range response in lidar systems. In one embodiment, a lidar system includes a laser, and a detector. First optics direct light from the laser on a beam path along a first optical axis of the first optics. Second optics image the light from the beam path onto a second plane that is substantially normal to the first plane. The second optics have a second optical axis that differs from the first optical axis. The first and the second optical axes lie in a same first plane. A first line in the first plane intersects a second line in the second plane at an acute angle. The first line is perpendicular to the first optical axis. A spatial filter configured in or near the second plane filters the light from the second optics onto the detector.

42 Claims, 22 Drawing Sheets

(58) Field of Classification Search
CPC .............. H01L 27/1465; H01L 31/107; H01L 27/14649; H01L 27/1464
See application file for complete search history.

(56) References Cited

U.S. PATENT DOCUMENTS

| | | | | |
|---|---|---|---|---|
| 2007/0076201 A1* | 4/2007 | Babin | ................... | G01N 21/53 |
| | | | | 356/338 |
| 2009/0201486 A1* | 8/2009 | Cramblitt | ............... | G01S 17/89 |
| | | | | 356/4.01 |
| 2010/0277723 A1* | 11/2010 | Rezac | ................... | G01N 21/65 |
| | | | | 356/301 |
| 2012/0274937 A1* | 11/2012 | Hays | ....................... | G01S 17/58 |
| | | | | 356/337 |
| 2013/0222786 A1* | 8/2013 | Hanson | ................... | G01P 5/26 |
| | | | | 356/28 |

\* cited by examiner

TILTED IMAGE PLANE LIDAR

CROSS REFERENCE TO RELATED APPLICATIONS

This patent application is a continuation patent application claiming priority to, and thus the benefit of an earlier filing date from, U.S. patent application Ser. No. 14/869,448 (filed Sep. 29, 2015), which claims priority to, and thus the benefit of an earlier filing date from, U.S. Provisional Patent Application No. 62/056,945 (filed Sep. 29, 2014), the entire contents of each of which are hereby incorporated by reference.

FIELD OF THE INVENTION

The inventive aspects herein generally related to lidar systems

BACKGROUND

The interrogating laser of a lidar system is used to cause emissions that are detected by a receiver of the lidar system. The detected emissions can be used to determine spatial distributions and other parameters and materials. The emissions may result from any number of processes (e.g., Mie scattering, Raleigh scattering, nonlinear scattering, scatter from hard targets, parametric processes, Raman scattering, fluorescence, laser induced breakdown etc.).

Lidar systems are either monostatic or bistatic. Monostatic optical arrangements share the same aperture for transmitting and receiving. These arrangements have the advantage of optical returns being focused onto relatively fast and small detectors regardless of the range of the interrogated material. Moreover, a single scan mirror can be used for directing the interrogating laser beam and the receiver's field of view. This common scanner for transmitting and receiving allows the system to have a relatively small field of view that results in relatively low background signatures. However, when emissions are produced near the receiver, they generally provide much larger detected signals than emissions generated at more distant ranges, thus making detection of materials farther away more difficult.

Bistatic optical arrangements use separate apertures for the laser and receiver. In these arrangements, the focusing optics for the receiver are generally configured so that near range emissions do not come to focus at the receiver. The field of view of the receiver should be large enough to accommodate imaged illumination patterns from the laser beam path. However, an enlarged field of view generally results in more background radiation being collected, which reduces the signal to noise ratio.

SUMMARY

Systems and methods presented herein provide for improved range response in lidar systems. More particularly, the embodiments herein relate to lidar systems that operate in distributed mediums (e.g., water, air, tissues with embedded materials, etc.) having emissions ranging from a near field of view to a far field of view. In one embodiment, a lidar system includes a laser, a detector, and first optics operable to direct light from the laser on a beam path along a first optical axis of the first optics. The lidar system also includes second optics having a second optical axis that differs from the first optical axis. The first and the second optical axes lie in a same first plane. The second optics image the light onto a second plane that is substantially normal to the first plane. A first line in the first plane intersects a second line in the second plane at an acute angle. The first line is perpendicular to the first optical axis. The lidar system also includes a spatial filter configured in or near the second plane to filter the light from the second optics onto the detector.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including hardware, software, firmware, and various combinations thereof are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
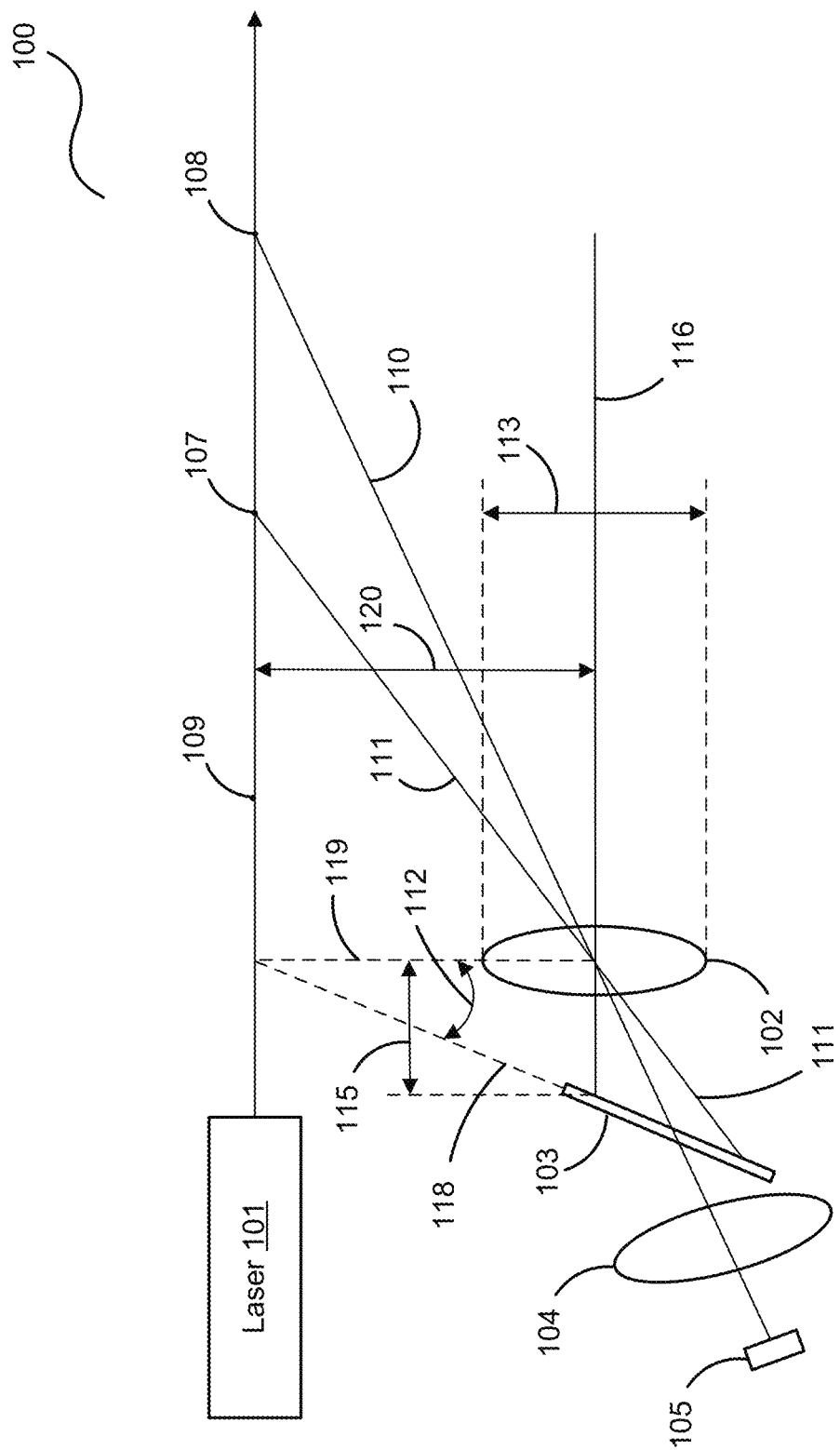
FIG. 1 is a block diagram of an exemplary lidar system.

FIG. 1 is a block diagram of an exemplary lidar system 100. The lidar system 100 comprises a laser 101 having optics that are operable to direct the light along the beam path 109. In this regard, the optics of the laser 101 comprise a first optical axis that coincides with the beam path 109. The laser 101 may be implemented in a variety ways as a matter design choice. For example, the laser 101 may be operable to pulse laser light along the beam path 109. Alternatively, the laser 101 may continuously direct light along the beam path 109. Moreover, the laser 101 may be operable to direct light in any variety of wavelengths and/or polarizations depending on, for example, environmental conditions, desired return emissions, etc. Accordingly, the laser 101 is combination of software, hardware, firmware, and optics, operable to direct light along the beam path 109.

The lidar system 100 also includes a receiver configured from optics 102 (e.g., a lens), a spatial filter 103, and a detector 105. The optics 102 comprise an optical axis 116 that generally lies in the same plane as the beam path/optical axis 109. For example, the optical axis 109 and the optical axis 116, while different, generally lie in the same plane as the view of the page representing the lidar system 100 and, in this embodiment, generally run parallel to one another, neglecting certain design tolerances. The optics 102 and thus the optical axis 116 are offset some distance 120 from the optical axis 109, generally referred to herein as the "bistatic offset".

The optics 102 are operable to receive light from the beam path 109 and to image that light onto the spatial filter 103. To illustrate, the optics 102 receive light from a near position 107 ranging through a far position 108. The light from the near position 107 is illustrated with the ray 111 whereas the far position 108 is illustrated with the ray 110.

The spatial filter 103 comprises an aperture that is operable to filter off a portion of the light from the beam path 109. For example, to improve the far field of view range of the lidar system 100, the spatial filter 103 filters off the light from the near position 107 on the beam path 109 because the stronger emissions from the near position 107 tend to obscure the emissions from the far position 107. As illustrated, the ray 110 from the far position 108 is allowed to pass through the spatial filter 103 whereas the ray 111 from the near position 107 is rejected by the spatial filter 103.

The spatial filter 103 is configured in or near a second different plane at an acute angle and at a distance 115 from the optics 102, generally referred to herein as the focal distance 115 of the optics 102. To illustrate, the spatial filter 103 is configured in a plane that is normal to the plane illustrating the view of the lidar system 100. The second plane intersects the plane of the lidar system view on a line 118. Then, assuming a line 119 is drawn in the plane of the lidar system view roughly perpendicular to the optical axis 116 of the optics 102, an acute angle 112 is formed. Thus, the plane in which the spatial filter 103 lies (or is configured proximate to) is configured at an acute angle of a plane normal to the plane of the lidar system view intersecting at the line 118. This plane of the spatial filter 103 is generally referred to herein as the "tilted image plane".

Other optics 104 (e.g., a lens) are optionally configured behind the spatial filter 103 to direct the ray 110 from the far position 107 onto the detector 105. The optics 102 and 104 may be configured in a variety ways as a matter design choice. For example, the optics 102 is generally configured as a lens having a diameter 113. However, the optics 102 may be representative of one or more optics depending on design considerations, details of which are shown and described below. The detector 105 may also be configured in a variety ways as a matter design choice. For example, in some embodiments, the detector 105 comprises a Photomultiplier Tube (PMT). Alternatively or additionally (e.g., in a dual receiver embodiment), the detector 105 may be a PIN diode detector. Other exemplary embodiments are shown and described below.

The embodiments herein have elements and advantages of both bistatic and monostatic lidar systems without many of the disadvantages of those lidar systems (e.g., bright near-field emissions competing with dim far-field emissions, complex and unwieldy designs, etc.). For example, the lidar system 100 can adaptively customize range response which, in turn, reduces dynamic range constraints of the lidar system 100. The lidar system 100 can also narrow the field of view and attenuate background signals. In this regard, the lidar system 100 can selectively block near range emissions and improve dynamic range control. The lidar system 100 may also be operable to employ a shared scan mirror that aligns the receiver and transmitter portions of the lidar system 100, as can be seen in the alternative embodiment of FIG. 4.

It should be noted that it is not necessary for the two optical axes 109 and 116 to be parallel as the position of the tilted image plane may be determined for non-parallel optical axes. For example, the laser beam path 109, even if not parallel to the optical axis 116, comes to focus along the tilted image plane. The mathematical formulation of the emission range to the focal position along the tilted image plane can be modified as a matter of design choice while operating in the same manner.

Figure 2:
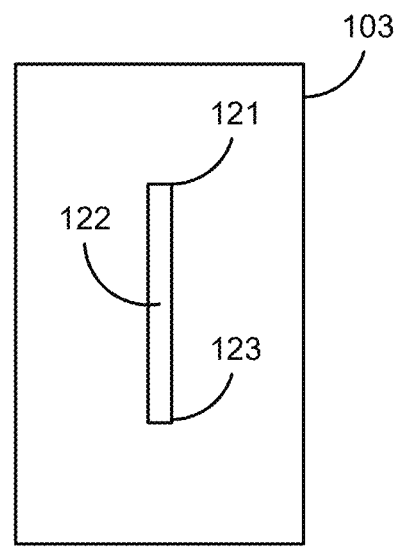
FIG. 2 is a block diagram of an exemplary spatial filter.

FIG. 2 is a block diagram of an exemplary spatial filter 103. In this embodiment, an aperture or slit 122 is configured in the spatial filter 103. Generally, the spatial filter 103 is configured from an opaque material that blocks light. When the spatial filter 103 is placed at or near the tilted image plane, the edge 121 of the aperture 122 that is closest to the focal point of the optics 102 blocks the light that is emitted from the more distant ranges (e.g., the light emitted beyond the far field of view point 108). The edge 123 of the aperture 122 that is furthest from the focal point of the optics 102 blocks the light emanating from the beam path 109 in the near range (e.g., the light emitted from the near field of view point 107 to the laser 101). In some embodiments, the detector 105 may be at the tilted image plane so that the spatial filter is defined by the spatial extent of the detector 105 itself.

The aperture 122 of the spatial filter 103 can be dynamically altered depending on a desired range response. For example, if a narrower field of view is desired, the length of the slit between the edges 121 and 123 may be decreased to block more light outside the desired range. The angle 112 of the spatial filter 103 can also be dynamically changed to alter the range response of the lidar system 100. For example, the spatial filter 103 lies in and or is proximate to the tilted image plane. When that tilted image plane is changed, the point on the beam path 109 which the spatial filter 103 views is also changed. Coupled with the ability to dynamically change the field of view, the lidar system 100 can effectively "close in" on a point of the beam path 109 and image that point via the detector 105.

Figure 3:
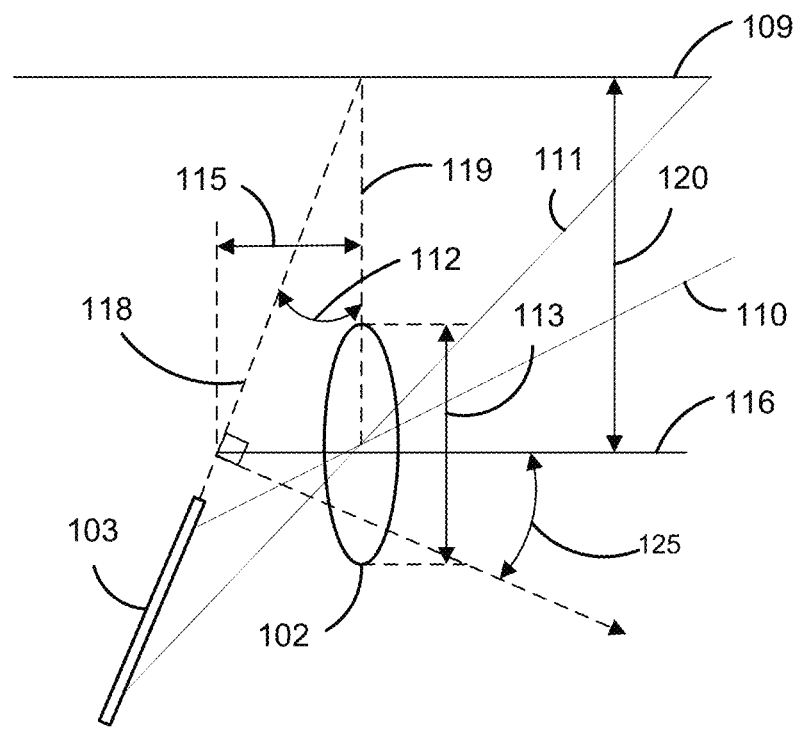
FIG. 3 is a block diagram of an exemplary tilted image plane of the lidar system of FIG. 1.

FIG. 3 is a block diagram of the exemplary tilted image plane of the lidar system 100. Generally, a mapping between position on the aperture 122 and the range of an emission point can be established as follows:

$$\xi(r) = \frac{F\sqrt{(F^2 + B^2)}}{r - F},$$

where r is the range (e.g., the distance between the points 107-108), F is the focal length 115 of the optics 102, B is the bistatic offset 120, and ξ is a distance along the tilted image plane from the focal point of the optics 102. By choosing the width of the slit of the aperture 122 based on desired range, a customized range response can be established with the lidar system 100. The near range edge 123 of the aperture 122 is operable to reduce dynamic range requirements that would arise from the undesirable detection of near range emissions.

Additionally, the spatial filter 103 itself may be moved in the tilted image plane (e.g., along the line 118) to tailor the range response based on a static aperture size. For example, when a predetermined range is desired and the dimensions of the aperture 122 (e.g., the slit between the edges 121 and 123) are statically configured, the field of view of the lidar system 100 can be changed by sliding the spatial filter 103 along the tilted image plane. In this regard, the range response can also be tailored based on the tilt of the spatial filter 103. With this in mind, the following table illustrates one exemplary set of design considerations of the lidar system 100.

ment, an F/2 imaging system was implemented resulting in an 8 inch focal length 115 with a tilted image angle 125 of about 69° (this angle 125 is shown and described in greater detail below).

Figure 4:
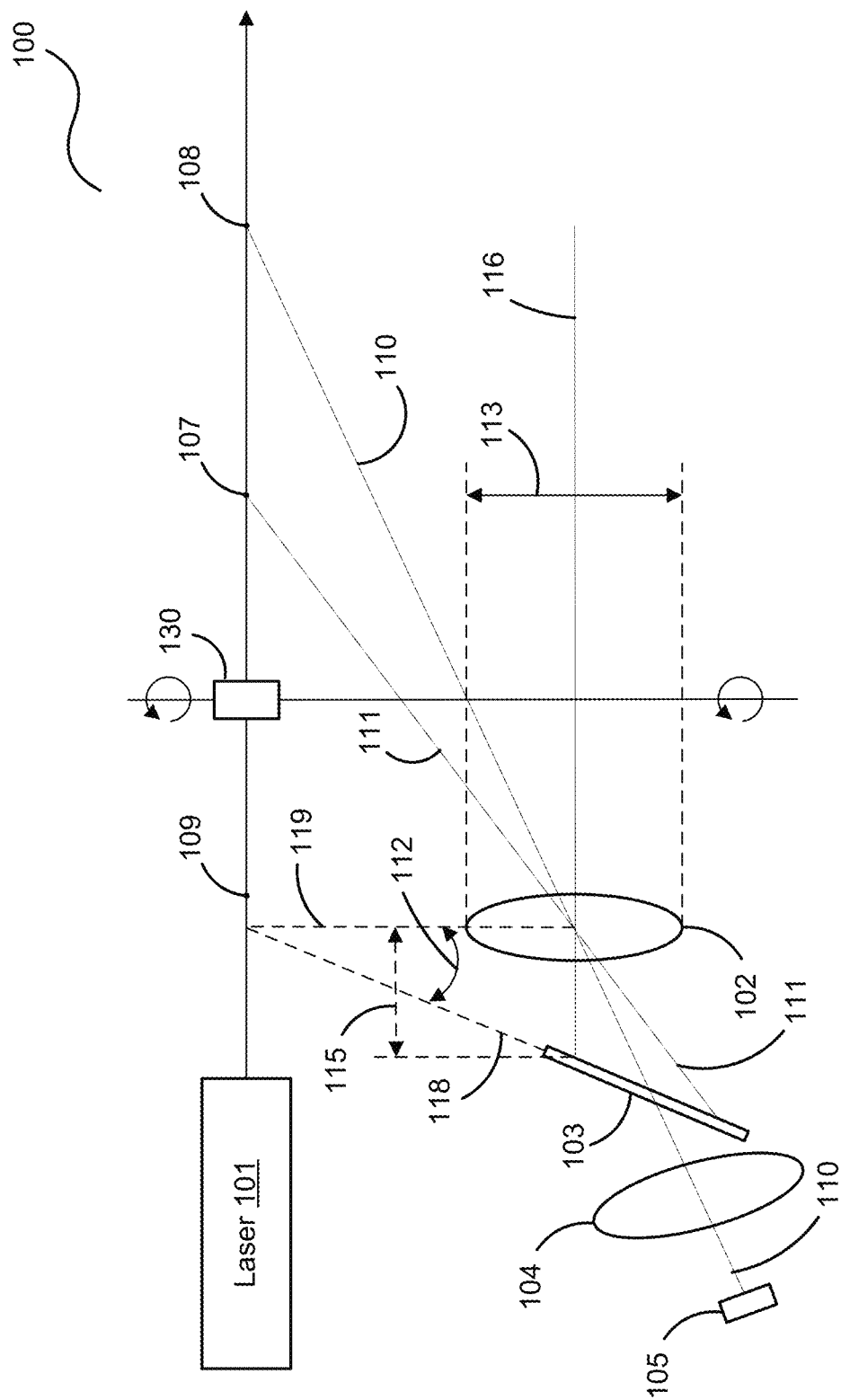
FIG. 4 is a block diagram of another exemplary lidar system.

FIG. 4 is a block diagram of another exemplary lidar system 100. In this embodiment, the lidar system 100 is configured with a scan mirror 30 that is operable with both the transmitter portion of the lidar system 100 (e.g., the laser 101) and the receiver portion of the lidar system 100 (e.g., the optics 102/104, the spatial filter 103, and the detector 105). Generally, the scan mirror 30 has little bearing on the imaging and range considerations and is an optional feature that allows the lidar system 102 rotate. In other words, the scan mirror 30 is operable to provide the lidar system 100 with scanning imaging capabilities without affecting the range characteristics of the lidar system 100.

Although shown with respect to the scan mirror 130 rotating in one particular direction, the invention is not intended to be limited as such. Rather, the scan mirror 130 may be configured to allow the lidar system 100 to scan in one or more directions. Moreover, the scan mirror 130 may be representative of multiple mirrors and may even allow the lidar system to scan in virtually any axis of rotation without affecting the operational aspects of the lidar system 100 (e.g., the range response).

Figure 5A:
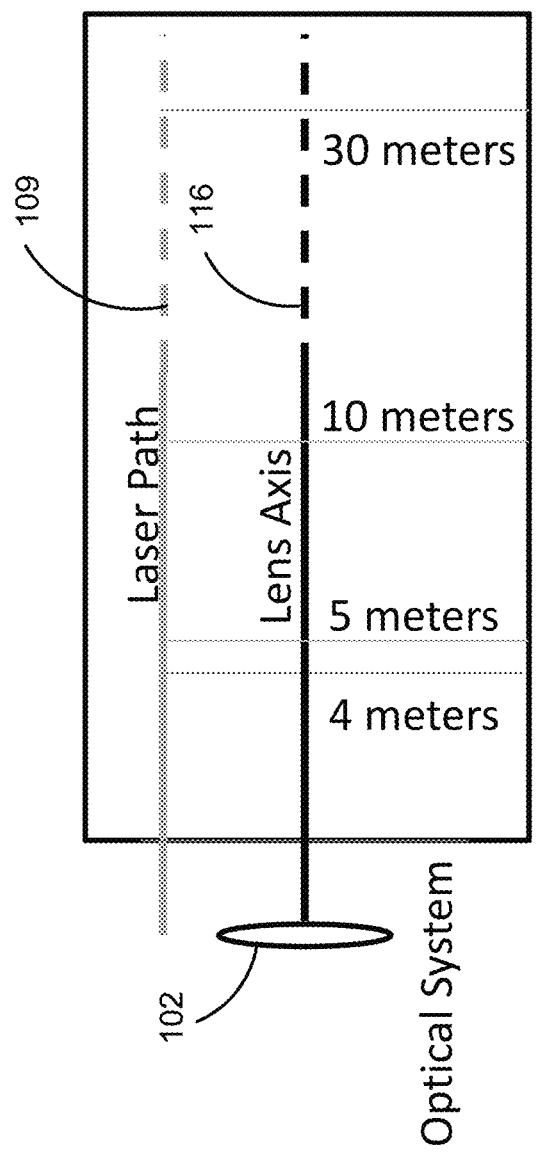
FIGS. 5A-5E exemplarily illustrate a lidar system's sensitivity to isotropic emissions from various distances.
Figure 5B:
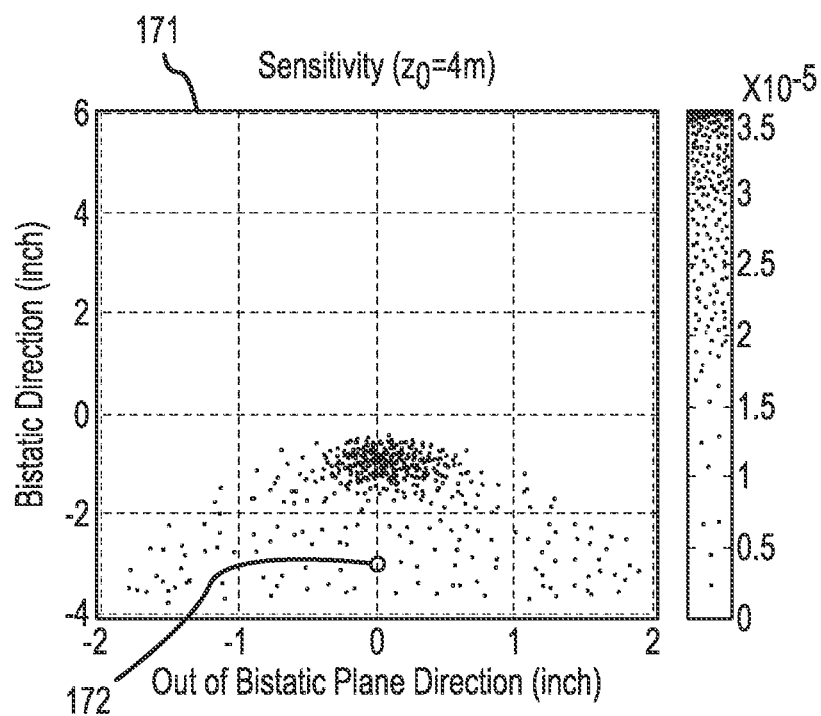
Figure 5C:
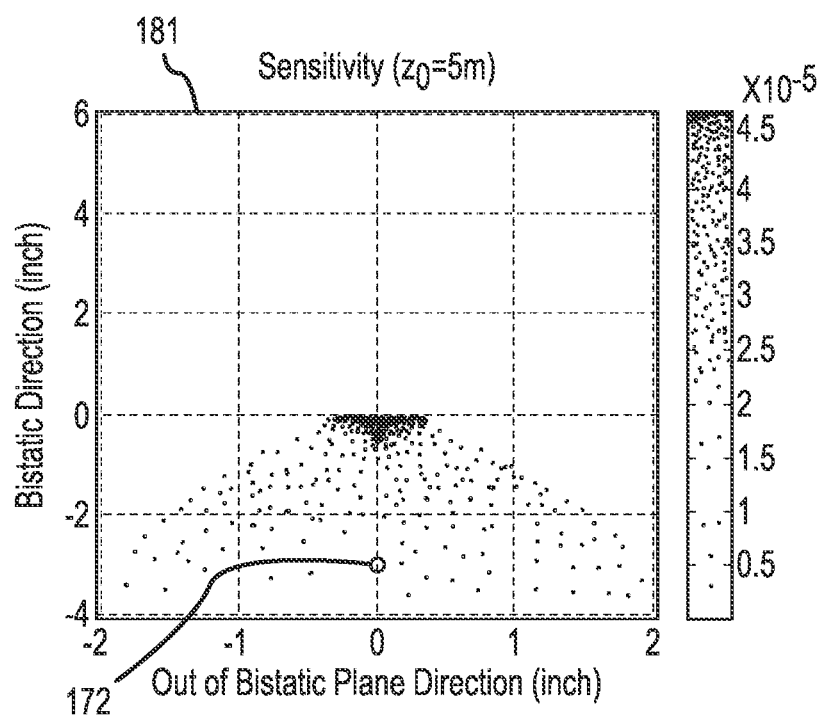
Figure 5D:
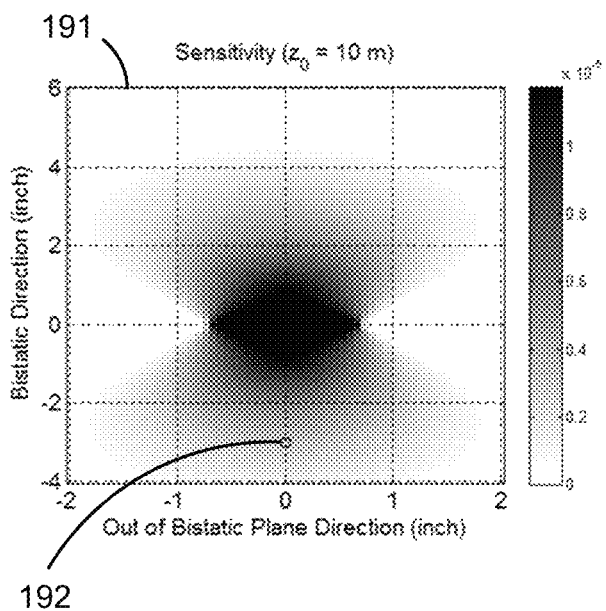
Figure 5E:
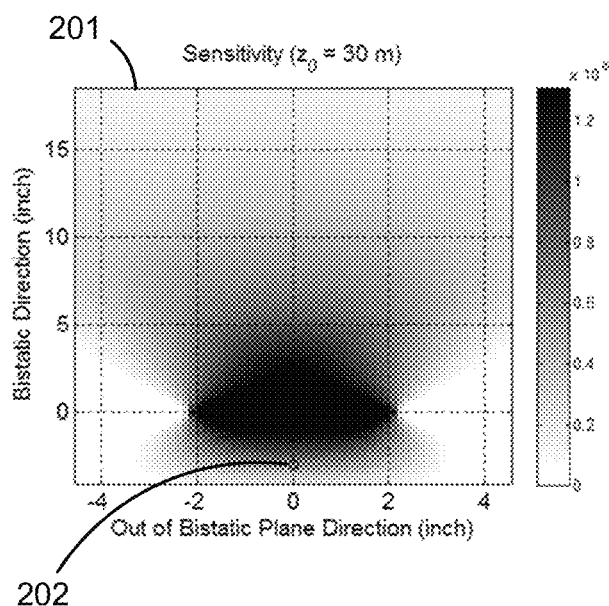

One effect of the above optical arrangement of the lidar system 100 is that receiver sensitivity to emissions in the outside volume differs from traditional optical systems. FIG. 5A exemplarily illustrates the lidar system 100 and FIGS. 5B-5E illustrate the lidar system 100's sensitivity to isotropic emissions from various distances. Sensitivity to isotropic

| Design Specification: | Source/Rationale: | Implications: |
|---|---|---|
| Lens diameter 113 (D) = 4 inches | Radiometric analysis | Scanner design, window size, and angle range |
| Bistatic offset 120 (B) = 3 inches | B > D/2 including room for mounts and laser spot. Larger distances may require a larger scan mirror | |
| Focal length 115 (F) = 8 inches | Overall "packaging" constraints, | A lower distortion lens design |
| Image angle 125 (α) = 69.44° | α = arctan (F/B) | Collection optics design and tailored range response |
| 10.5 mm < Aperture 122 length < 12.1 mm | When near range cutoff (e.g., point 107) is 5 mm, distance along aperture 122 from focal point is given by $$\xi(r) = \frac{F\sqrt{(F^2 + B^2)}}{r_{near\,range\,(107)} - F},$$ | Collection optics design and tailored range response |

In this embodiment, the optics 102 is a lens with a 4 inch diameter. Assuming a circular shape, the optical design of the lidar system 101 may be readily implemented when the bistatic distance 120 is greater than the radius of the imaging lens. This avoids mechanical and/or optical interference between the transmit and receive channels. To provide an inch of margin for mechanical mounts, a bistatic distance of 3 inches may be selected. A normal from the tilted image plane makes a tilt angle 125 relative to the optical axis 116 given by α=arctan (F/B).

Collection of the light transmitted through the aperture 122 onto the detector 105 is more challenging for larger tilt angles. Accordingly, design considerations generally drive the use of a shorter focal length 115. However, lower focal number (F/#) systems are generally more difficult to design. Accordingly, a balance is struck between the lower F/# and the light collection for steeper image planes. In this embodiemissions is proportional to the emitted power passing through the aperture 122 of the spatial filter 103 lying in the tilted image plane. The graphs 171, 181, 191, and 201 of FIGS. 5B-5E show the power received at the optics 102 from various distances (i.e., 4 m, 5 m, 10 m, and 30 m, respectively). The points 172, 182, 192, and 202 illustrate the position of the optical axis 116 of the optics 102. The graphs 171 and 181 show that near range fluorescence is blocked by the spatial filter 103. However, the graphs 191 and 201 show that near range fluorescence has passed albeit with larger amount of far range fluorescence.

In this example, the aperture 122 (e.g., slit) in the spatial filter 103 is designed to cut off light emitted from the beam path 109 at ranges less than 5 m. The graph 171 shows that light emitted from the beam path 109 is outside the field of view corresponding to the aperture 122 of the spatial filter 103. The other graphs 181, 191, and 201 show the collection sensitivity for 5 m, 10 m, and 30 m respectively as well as the range dependent field of view with the laser beam path 109 within the highest sensitivity volume.

In general, the dimension of the aperture 122 may be selected to match the laser divergence to ensure efficient collection of laser stimulated emissions from the beam path 109. In some instances, the lidar system 100 may produce laser stimulated emissions at multiple wavelengths of polarizations. These emissions may occur from multiple and/or simultaneous processes including, for example, Raleigh scattering, Mie scattering at the wavelength of the laser 101. Additional processes include fluorescence, Raman scattering, and laser induced breakdown at wavelengths other than those of the laser wavelength.

Figure 6:
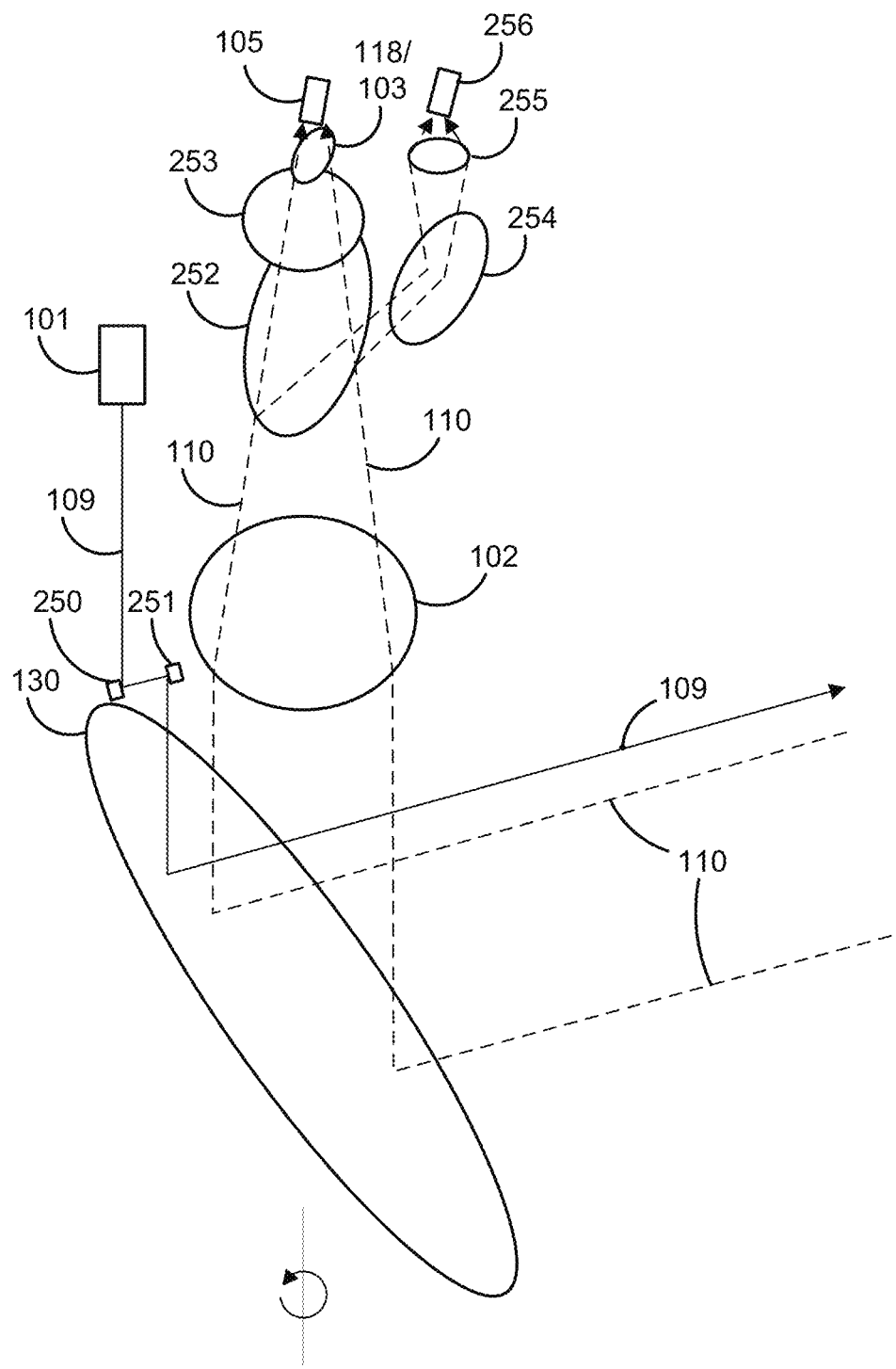
FIG. 6 is a block diagram of an exemplary lidar system employing a two channel receiver.

FIG. 6 is a block diagram of exemplary two channel receiver employed with the lidar system 100. In this embodiment, the lidar system 100 comprises a pair of turn mirrors 250 and 251 that are used to direct the beam path 109 along a line that is substantially parallel to the optical axis 116 of the optics 102. This allows the transmitter and the receiver to be implemented in a compact form. The receiver portion comprises a scan mirror 130 that rotates about an axis normal to the optical axis of the optics 102. The scan mirror 130 may be tilted at or about 45° to the optical axis 116 of the optics 102. A "window" configured between the scan mirror 130 and the distributed medium interrogated by the laser 101 (a.k.a. the "interrogated volume") allows for a deviation from 45° to be used to control the direction of the window's back reflections. Of course, additional scanning mirrors or other scanning mechanisms may be used to provide scanning in additional directions.

The lidar system 100 also comprises dichroic mirror 252 that is used to reflect light at the same wavelength as the laser 101 while transmitting light resulting from fluorescence along the beam path 109. Alternatively or additionally, a polarizing beam splitter may be used to separate the polarizations of light. One or more bandpass filters 253 may be used to block additional light at the laser wavelength leaking through the dichroic mirror 252. The fluorescence light emitted from the beam path 109 comes to focus on the tilted image plane where the spatial filter 103 lies in or is proximate to. The spatial filter 103 transmits the light onto the detector 105 which, in this embodiment, comprises a PMT to collect the light. Again, the spatial filter 103, positioned at or near the tilted image plane, limits the receiver's field-of-view and reduces the detection of background light.

Light received from the beam path 109 that is reflected from the dichroic mirror 252 is propagated to a second detector 256. For example, the light from the beam path 109 comes to focus on a second different tilted image plane and is refocused by a reimaging optics 255 (e.g., a lens after reflection from an in band tuning mirror 254. A spatial filter may also be inserted at this tilted image plane as a matter of design choice. The reimaging optics 255 demagnifies the image so that it can fit on a smaller detector 256 (e.g., a PIN diode detector or an avalanche diode). This change in magnification generally changes the tilt angle of the reimaged tilted image plane. However, the detector 256 does not need to be parallel to the tilted image plane.

As mentioned, the F/# of the imaging optics (e.g., the optics 102) depends generally on the length of the aperture 122 of the spatial filter 103. For example, if the detector 105 has a collection area that is comparable to a slit size of the spatial filter 103, the detector 105 may be placed directly behind the spatial filter 103 in the relatively same orientation of the tilted image plane. However, some detectors may not be designed to efficiently collect light at such steep angles of incidence (e.g., due to surface reflectance and other detector properties).

To increase the detector 105's light collection efficiency, the detector 105 may be arranged to reduce the angle between the optical axis 116 and the detector 105's aperture. In this regard, the standoff between the aperture 122 of the spatial filter 103 and the detector 105's aperture is increased. Depending on the F/# of the imaging optics, the additional standoff from the tilted image plane may prove inoperable. However, additional reimaging optics may allow the light from the beam path 110 to be projected onto the detector 105 through the spatial filter 103.

Figure 7:
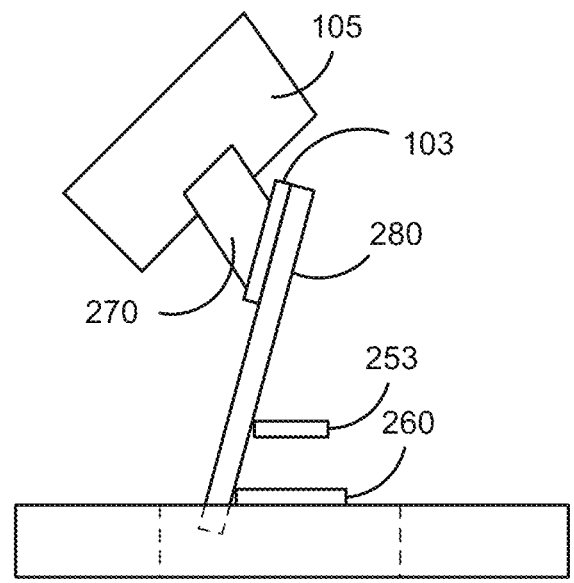
FIG. 7 is a block diagram of an exemplary lidar system receiver employing a prism.

FIG. 7 is a block diagram of exemplary lidar system receiver employing a prism 270 in one example of the reimaging optics that allows the light from the beam path 110 to be projected onto the detector 105 through the spatial filter 103 with the additional standoff distance from the tilted image plane. The detector 105 in this embodiment is a PMT and the prism coupler 270 is configured with the aperture of the detector 105. Light passing through the spatial filter 103 impinges on a surface of the prism 270 and passes to the detector 105.

The prism surface may be coated with an antireflective coating designed for anticipated optical bandwidth that is to be detected. The antireflective coating may also be designed based on the angle of incidence of the surface of the prism 270 and the F/# of the imaging optics 102. This provides an advantageous solution because it is generally easier to place an antireflective coating on a custom optic than it is to modify input windows for detectors, such as those found in commercially purchased PMTs.

The prism 270 serves multiple purposes. Light that enters the tilted surface of the prism is refracted away from the optical axis 116 of the optics 102. The new optical axis direction within the prism 270 reduces the constraints on the position of the detector 105. More specifically, the detector 105 may be configured so that light entering the detector 105 is incident upon the aperture of the detector 105. Due to the higher index of refraction within the prism 270, the divergence angles of light within the prism material are less than they would be in air. This further minimizes the impact of the standoff range between the detector 105 and the aperture 122 of the spatial filter 103. Total internal reflection from the prism surfaces may also be used to minimize the impact of the standoff distance between the aperture 122 of the spatial filter 103 and the detector 105.

Also illustrated in this embodiment is an optional laser line blocking filter 260 and a range response filter 280 configured with or near the tilted image plane. The filter 260 is operable to filter out unwanted wavelengths (i.e., laser lines) of the laser 101. The range response filter 280 is discussed in greater detail below.

Figure 8:
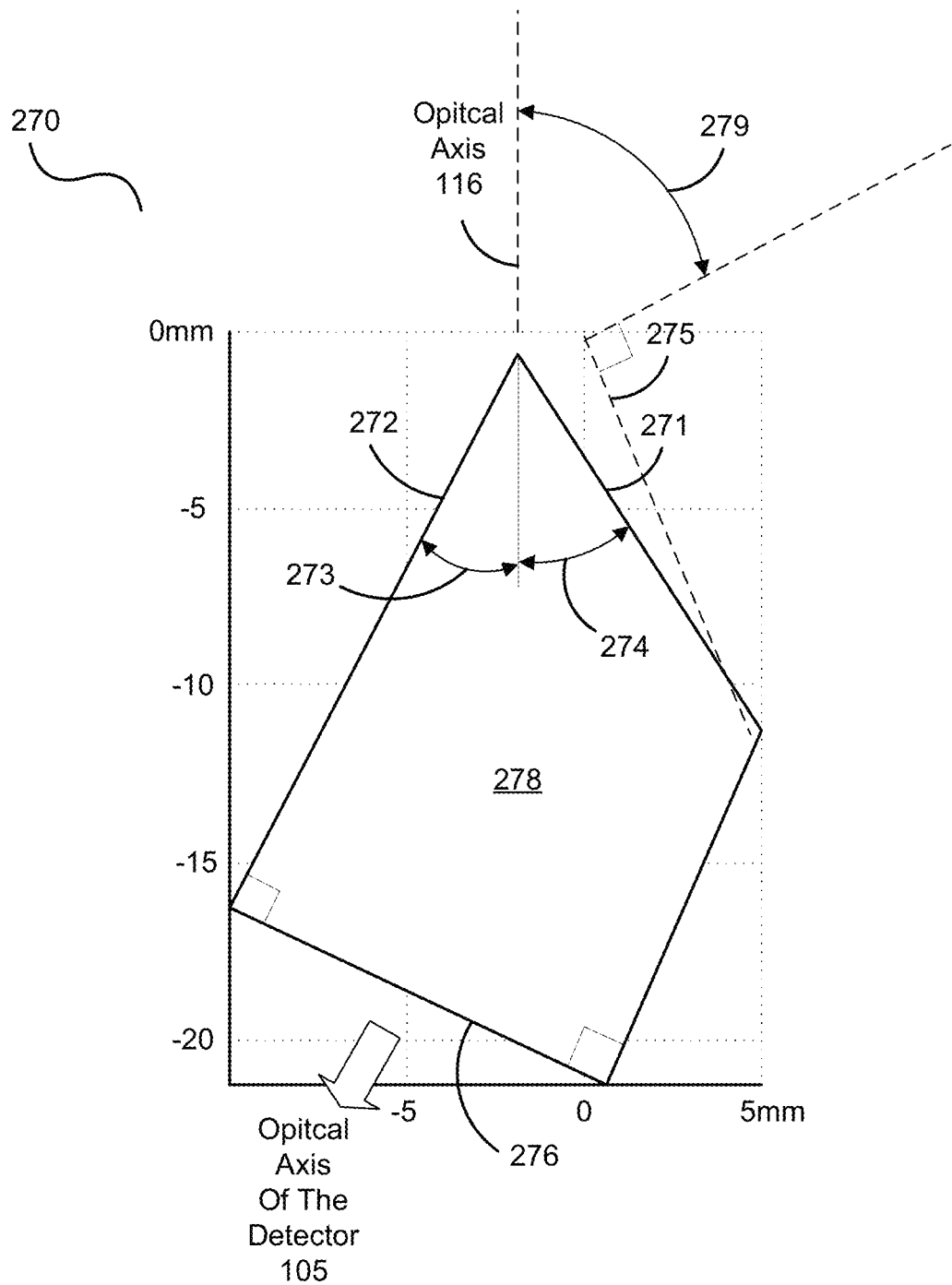
FIG. 8 is a block diagram illustrating exemplary design considerations of the prism of FIG. 7.

FIG. 8 is a block diagram illustrating exemplary design considerations of the prism 270. In this embodiment, the angle 279 between the optical axis 116 and a normal from the tilted image plane 275 is about 69° as described above. However, the angle 277 between the optical axis 116 and a normal from the surface 271 of incidence of the prism 270 can be designed for about 60°. In fact, the prism 270 can be designed for angles of incidence ranging from 45° to 75° for both polarizations depending on the antireflective coating on the surface 271 of the prism 270.

The optical axis within the prism 270 is directed at an angle 273 of approximately 25.18° relative to the incident optical axis 116. The other dimension of the prism 270 regards the angle 274 being configured at approximately 30°. The exit surface 276 of the prism 270 has a width of approximately 10.7 mm and is oriented to be approximately normal to the internal optical axis direction. Thus, a portion light entering the prism 270 is reflected from the top and bottom surfaces (i.e., those surfaces parallel to the view and illustrated as 278) prior to exiting the prism 270 via total internal reflection.

Mounts for the prism 270 generally make contact on the top and bottom surfaces, respectively, with a plastic having a low index of refraction so as to ensure total internal reflection for the expected illumination patterns at the contact points of the mounts. Additionally, the material of the mounts may be chosen so as to absorb light that is transmitted out of the side surfaces of the prism 270 as a means for reducing signal background from the internally scattered light.

Figure 9:
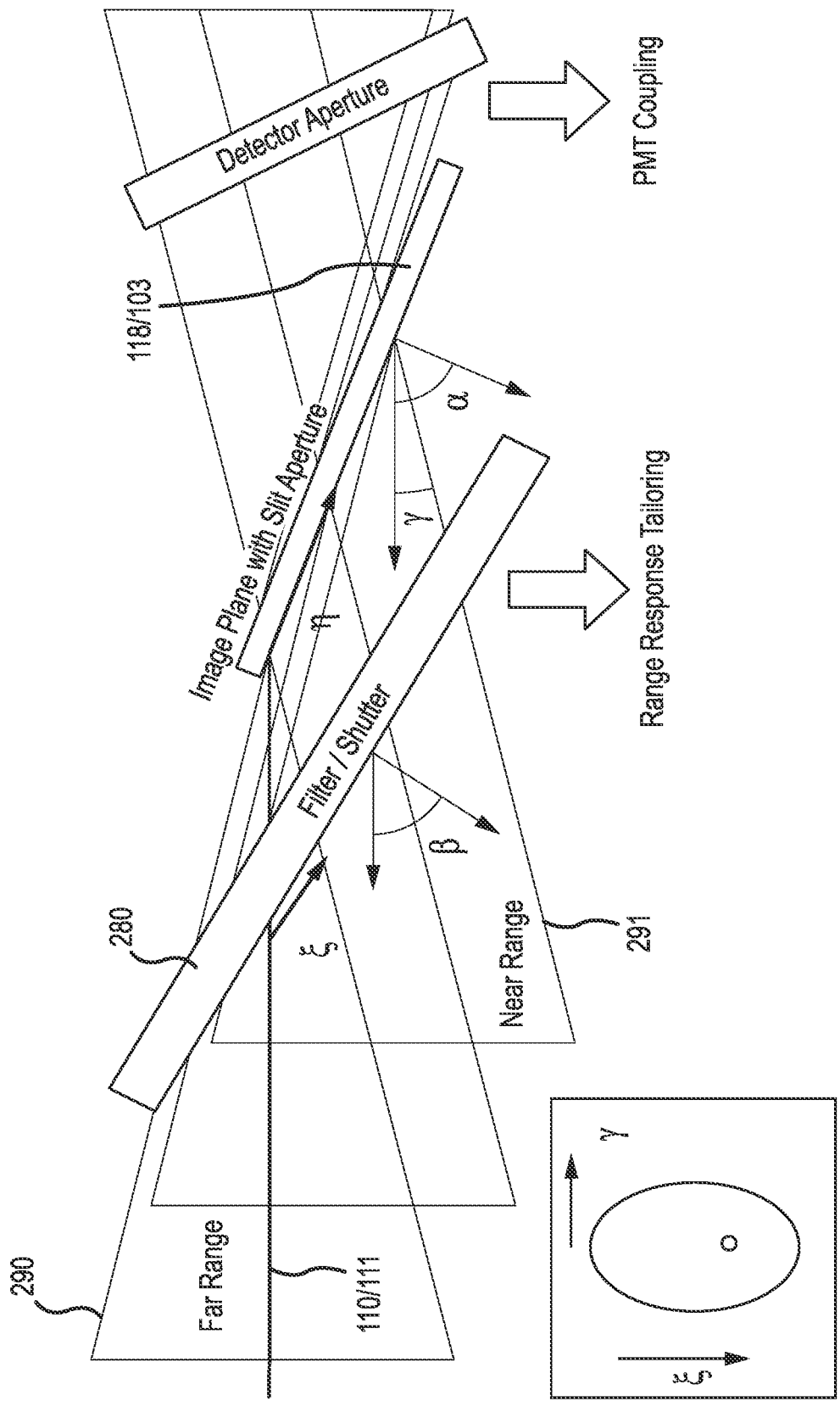
FIG. 9 is a block diagram of an exemplary range response filter.
Figure 10:
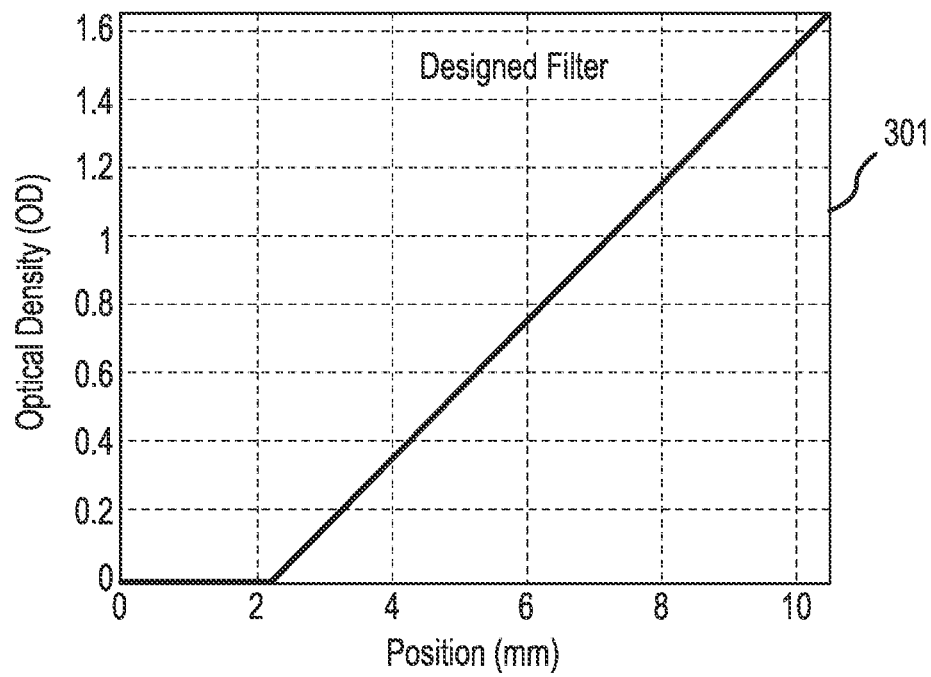
FIGS. 10-13 are graphs illustrating exemplary features of a Linear Variable Neutral Density Filter (LVND).
Figure 11:
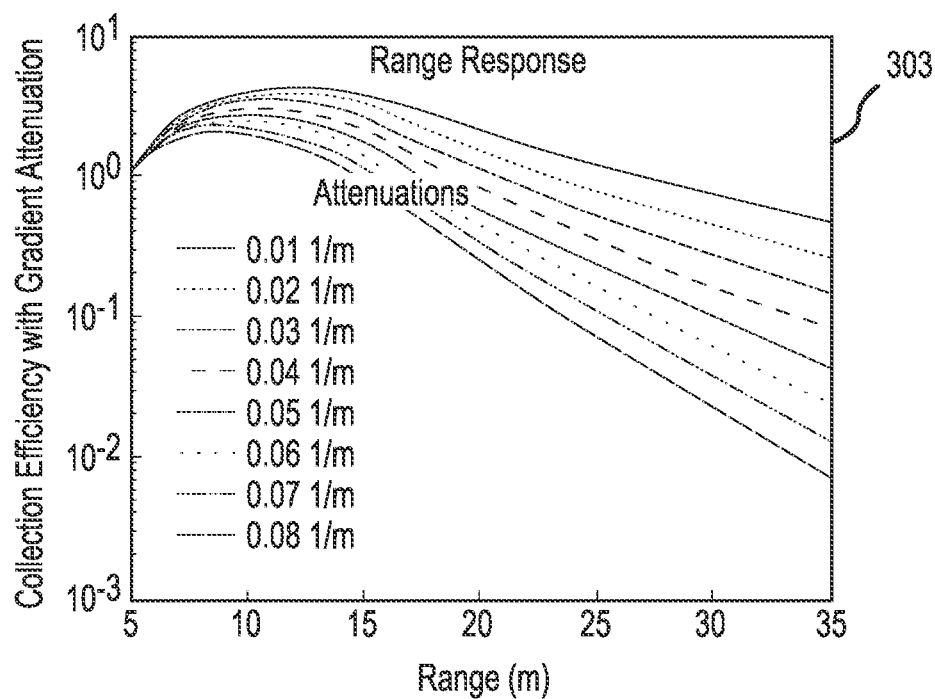
Figure 12:
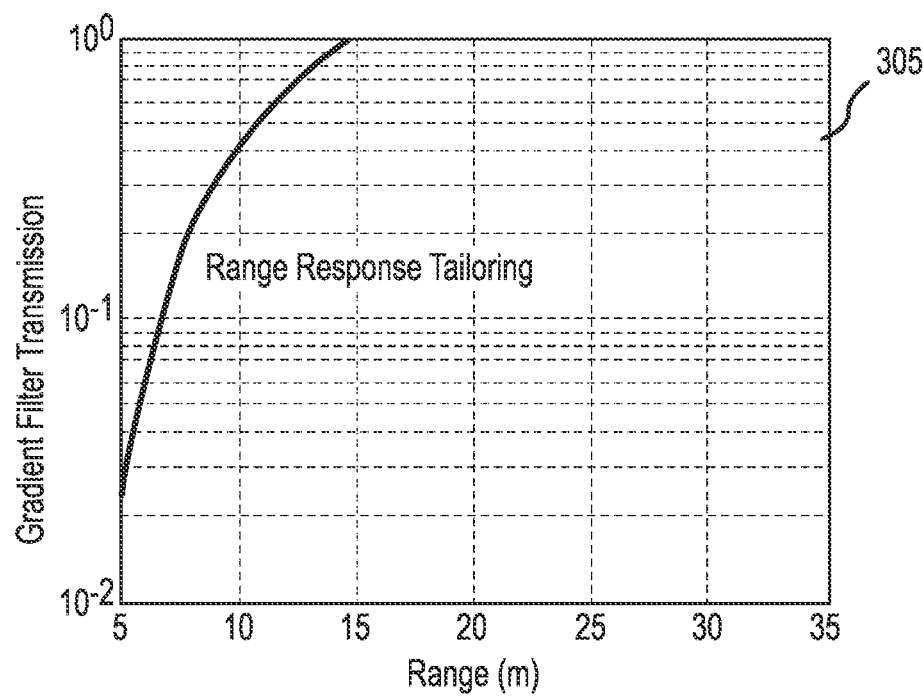
Figure 13:
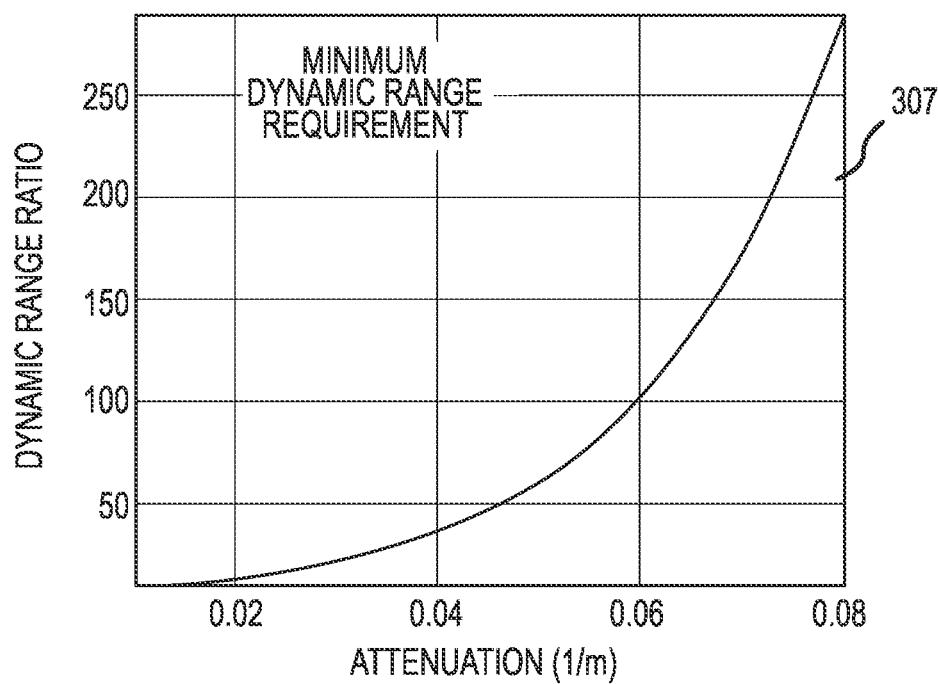

FIG. 9 is a block diagram illustrating an exemplary range response filter 280 of the lidar system 100. For example, the lidar system 100 provides a means for shaping the response of the system to emission sources of varying ranges. In particular, the lidar system 100 suppresses the response from emission sources at near ranges (e.g., from the near range point 107). By tailoring the system range response function to suppress the response of near range emission sources, the gain of the lidar system 100 affecting all ranges may be increased without near range saturation effects.

As illustrated in FIG. 9, the range response filter 280 attenuates light in a range dependent fashion. To illustrate, cones of light impinge the tilted image plane and the spatial filter 103 at various points along the spatial filter 103. The cone of light 290 emitted along the ray 110 from the far range point 108 along the beam path 109 shows the illumination path of light that is focused to the tilted image plane and the spatial filter 103 at one point. Similarly, the cone of light 291 emitted along the ray 111 from the near range point 107 along the beam path shows the elimination path of the light focused at a different point along the tilted image plane and the spatial filter 103. The range response filter 280 can be configured to further attenuate light depending on the desired range.

The range response filter 280 may be implemented in a variety of ways as a matter of design choice. For example, the filter 280 may be positioned at the tilted image plane or displaced from the tilted image plane. The filter 280 may run roughly parallel to the tilted image plane, although not required. Transmission through the filter 280 may be implemented as a gradient transmission, an electronically controlled spatial light modulator, and/or an opaque mask with limited spatial extent. The spatial variation in the filter 280 may be in a direction perpendicular to both the optical axis 116 and a normal from the filter surface. Alternatively or additionally, the spatial variations in the filter 280 may be in a direction within the bistatic plane of the lidar system 100.

In one embodiment, the filter 280 is a gradient filter that is positioned so that emissions from the near range positions (e.g., point 107 on the beam path 109) are transmitted with less efficiency than emissions from far range positions (e.g., point 108 on the beam path 109). Linear Variable Neutral Density (LVND) filters are examples of gradient filters suitable for such an embodiment. LVND filters can have optical density factors that linearly vary from 0 to 5 over a distance of about 40 mm along the component. It should be noted that the linear variation in the optical density factor corresponds to an exponential spatial dependence for transmission.

FIGS. 10-13 are graphs 301, 303, 305, and 307 illustrating exemplary features of an LVND filter of one exemplary embodiment. The graph 301 illustrates the use of an LVND filter 280 with an attenuation that ranges from an optical density of "0" to an optical density of 1.6 at about 8 mm. The graph 305 shows the optical systems range dependent transmission, with the LVND configured at the tilted image plane with the gradient along a direction coinciding with the bistatic plane. Calculations were made for a medium that attenuates light with an exponential attenuation ranging between 0.01 1/m and 0.08 1/m. The graph 303 takes into account the exponential attenuation and the $1/r^2$ collection efficiencies along with the system's range dependent transmission to present an overall relative system collection efficiency for laser stimulated emissions at varying ranges.

For any given exponential attenuation, the ratio the maximum to minimum relative system collection efficiency may be taken as a required dynamic range ratio. The graph 307 shows that the system using the LVND filter 280 may measure laser stimulated signals between 5 m and 35 m in a medium having an attenuation of 0.08 at 1/m, with the minimum and maximum signals differing by factor less than 300.

Figure 14:
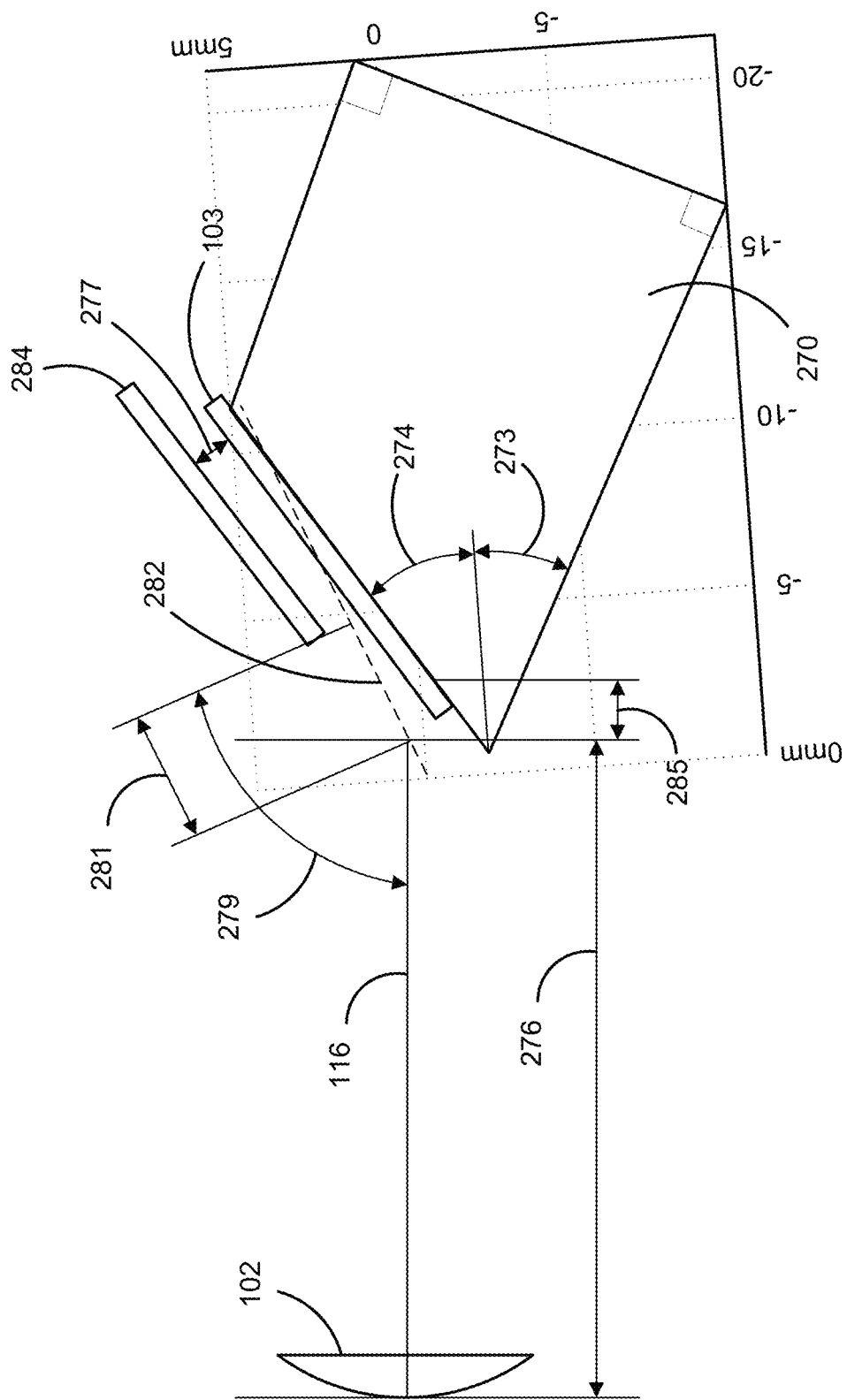
FIG. 14 is a block diagram illustrating a shutter being employed with a prism in an exemplary receiver of the lidar system.

Alternatively, the range response filter 280 may be configured to provide a single obscuration. This is similar to a gradient filter except that the filter is fully transmissive on one side and fully obscuring on the other. One implementation of such a filter is a single obscuring shutter. FIG. 14 is a block diagram illustrating a shutter 284 as the range response filter 280 being employed with the prism 270 in one exemplary embodiment.

In this embodiment, the edge of the shutter 284 may be translated over the tilted image plane 282 (and the spatial filter 103) some relatively close distance 277 (e.g., about 1 mm) to dynamically change the range response. The shutter 284 may be operable to translate along a shutter plane positioned in close proximity to the tilted image plane. This translation capability may be used to dynamically adjust the system range response to adaptively varying environmental or measurement conditions. For example, the shutter 284 may allow the system to increase gain in varying attenuating mediums and/or varying efficiency in the processes resulting in light at various ranges (e.g., the various forms of scattering and other processes mentioned above).

The relative positions and orientations of the spatial filter 103, the shutter 284, and the tilted image plane may be determined as a matter of design choice. For example, if the shutter edge is positioned at a location where the tilted image plane coincides with the shutter plane, a rapid gradient in the range response may be achieved. However, if the shutter edge is positioned at some distance away from the tilted image plane, the range dependent attenuation from obscuration of the shutter 284 is generally more gradual. And, more gradual range dependent attenuation is a consequence of a larger illumination region near the shutter edge corresponding to light emitted at positions within the laser beam path 109.

In this exemplary embodiment, the tilted image plane 282 is the plane where the light from the laser beam path 109 comes to a focus. The spatial filter 103 is configured at a slight angle relative to the tilted image plane 282. The tilted image plane is at an angle 279 of 69° relative to the optical axis 116. The spatial filter 103 and the range response filter 284 were set to 60 degrees relative to the optical axis 116. The separation between the range response filter 284 and the spatial filter 103 is a distance 277 of 1 mm. The 2 mm distance 285 is a separation between the range response filter and the spatial filter along the direction of the optical axis 116. And, 2 mm×cos(60)=1 mm, the relationship between the distance 285 and the distance 277. Although, each of these distances and angles were implemented as a matter of design choice for a particular application.

The shutter 284 is translated along its plane (e.g., at a 9 degree angle with relative to the tilted image plane 282) with the shutter 284 a distance of 2.8 mm away from the focal point of the optics 102. The distance from the prism 270, in this embodiment, to the optics 102 is approximately 209.5 mm. And the distance 285 is approximately 2 mm.

Figure 15:
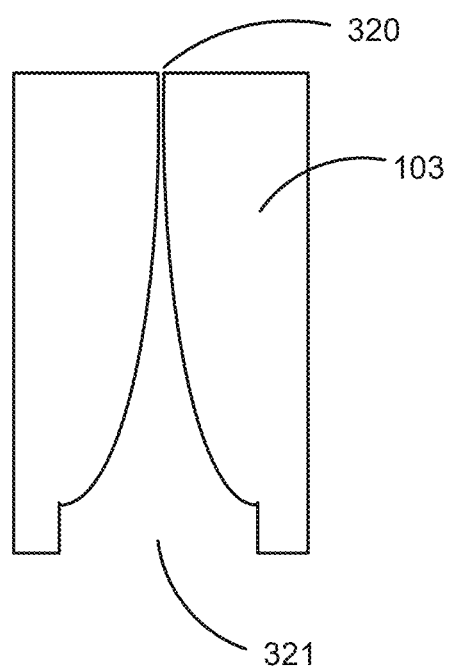
FIG. 15 is a block diagram of an exemplary spatial filter having variable widths.

FIG. 15 is a block diagram of an exemplary spatial filter 103 having an aperture with variable widths. In this embodiment, light emissions from locations within the beam path 109 at far ranges (e.g., point 108) come to focus near the filter at the position near the region 321. As the width of the aperture is greater at this region, the far range light is largely transmitted by the spatial filter 103. On the other hand, light emissions from locations in the near range (e.g., point 107) of the beam path 109 come to focus near the region 320 of the spatial filter 103. Consequently, the near range light "over fills" the aperture and is largely blocked by the spatial filter 103.

Intensity of light returning to an active system generally has a range response that is proportional to a reciprocal of the square of the range (or a distance from the receiver to the scattering or re-emission range). This is, in general, a consequence of the proportion of the solid angle extended from the scattering or the re-emission range subtended by the receiver aperture. Additionally, there may be an exponential range dependence due to scattering and/or absorption.

Figure 16:
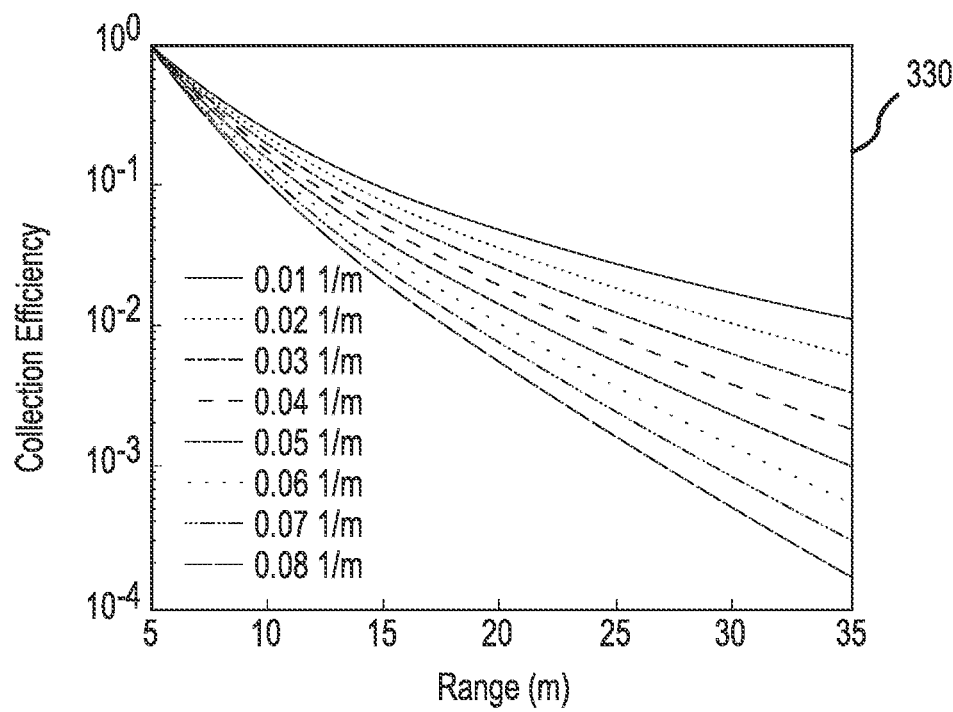
FIGS. 16-18 are graphs illustrating exemplary features of the range response filter of FIG. 15.
Figure 17:
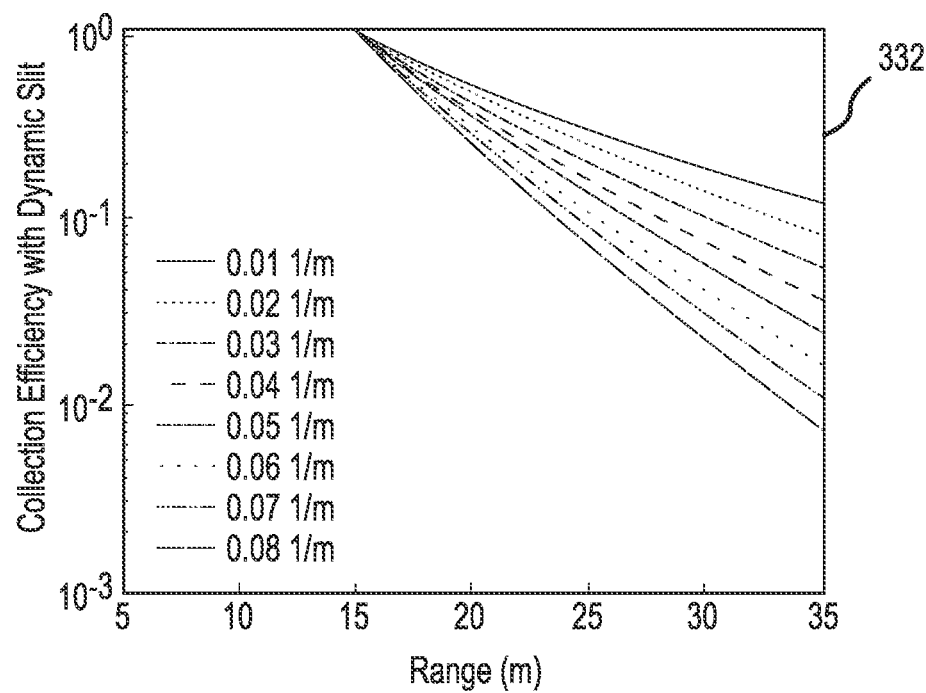
Figure 18:
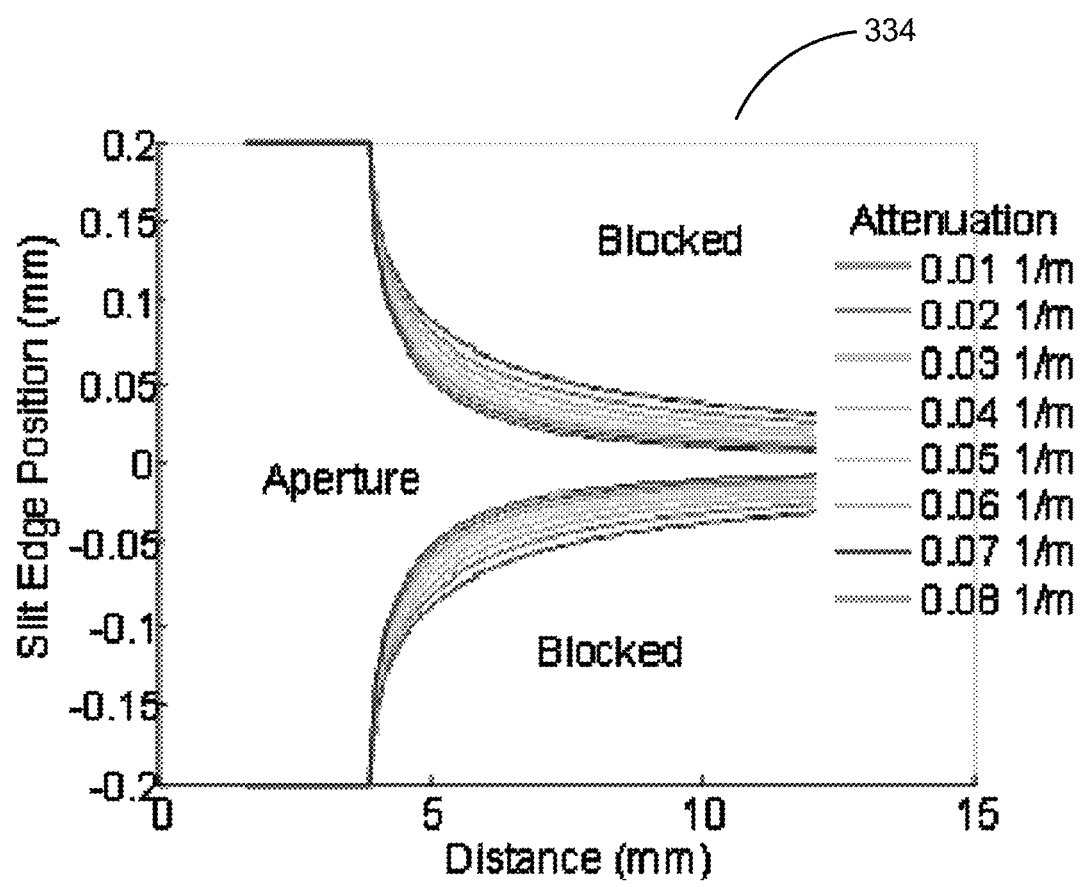

FIGS. 16-18 are graphs 330, 332, and 334, respectively, illustrating exemplary features of the range response filter of FIG. 16. For example, the graph 330 shows the collection efficiency of an aperture that is a function of range where the outgoing light is transmitted in a medium with an attenuation between 0.01 at 1/m and 0.08 at 1/m. If the lidar system 100 is to detect emissions from ranges between 5 m and 35 m, the lidar system 100 should have a dynamic range of nearly 4 orders of magnitude.

However, if the system efficiency is made to balance the collection efficiency so that a flat range response is achieved at the detector 105 at ranges between 5 m and 15 m, then only about two orders of magnitude of dynamic range may be needed as illustrated in the graph 332. Thus, the shape of the aperture may be calculated according to the desired range response for each attenuation value as illustrated in the graph 334. Generally, the aperture of the spatial filter 103 may be constructed from two opposing "blades" such that near ideal performance may be achieved by reducing separation between the blades at higher attenuation values. Such may be useful in circumstances where the medium which the lidar system 100 is interrogating comprises varying attenuation.

As mentioned, the range response filter may also be implemented as an electronically addressable spatial light modulator. A dynamically controlled amplitude mask may be used to dynamically modify the lidar system 100's response to light emitted from various ranges. This minimizes the dynamic range requirements of the lidar system 100.

To implement such, the lidar system 100 may vignette near range emissions. For example, because the lidar system 100 uses a common aperture, off axis angles correspond to near range emission ranges. Consequently, optical vignetting may be used to suppress light emanating from the near range positions (e.g., from the point 107 on the beam path 109). In this regard, the apertures for spectral filters or other optical elements may be specifically designed to suppress the near range returns.

Figure 19:
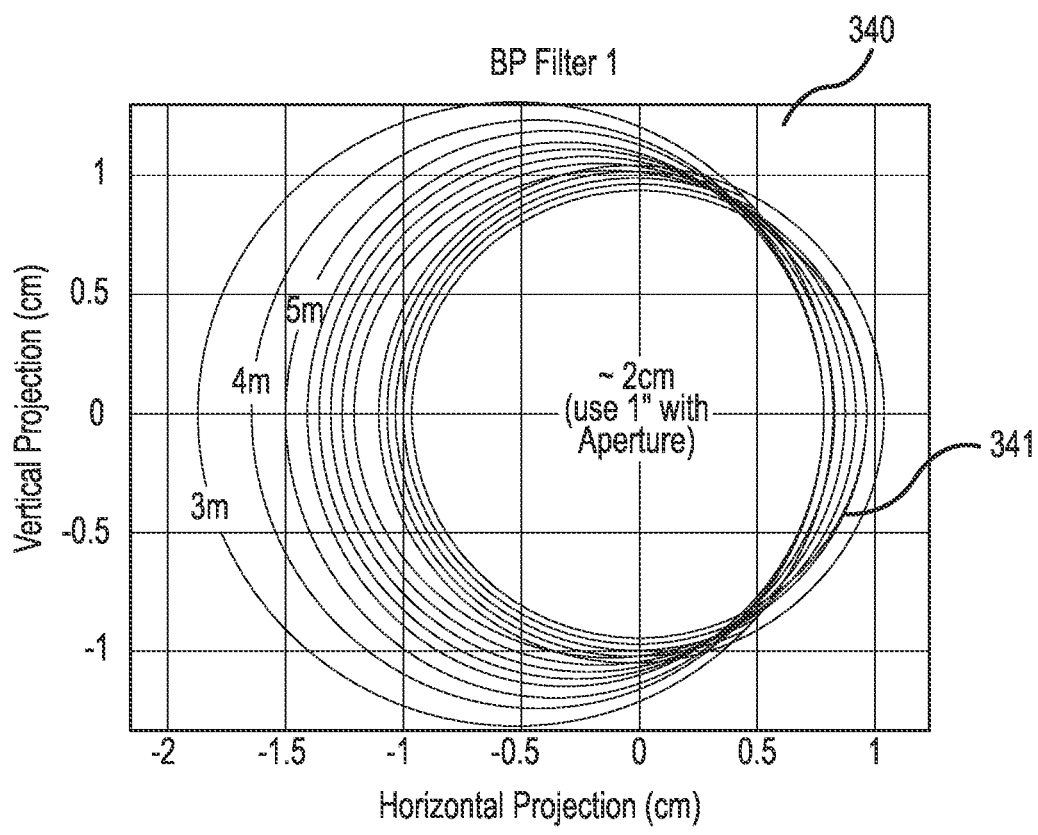
FIG. 19 is a graph illustrating exemplary design considerations of a bandpass filter operable within a lidar receiver.

FIG. 19 is a graph illustrating exemplary design considerations of a bandpass filter operable to suppress the near range returns. In this example, illumination patterns sizes are shown at the plane of the bandpass filter for light emanating from multiple ranges, including 3 m, 4 m, 5 m, etc. The bandpass filter inserted between the optics 102 and the tilted image plane may include a mask or an aperture that significantly attenuates light emanating from the near range positions. However, this filter fully transmits light emanating from the far range positions (e.g., from the point 108 on the beam path 109). Also, it is not necessary that the embodiments include a bandpass filter. Rather, this embodiment merely illustrates one alternative in which the aperture of the optical components herein can have different transmissions depending on the range of the emissions.

Figure 20:
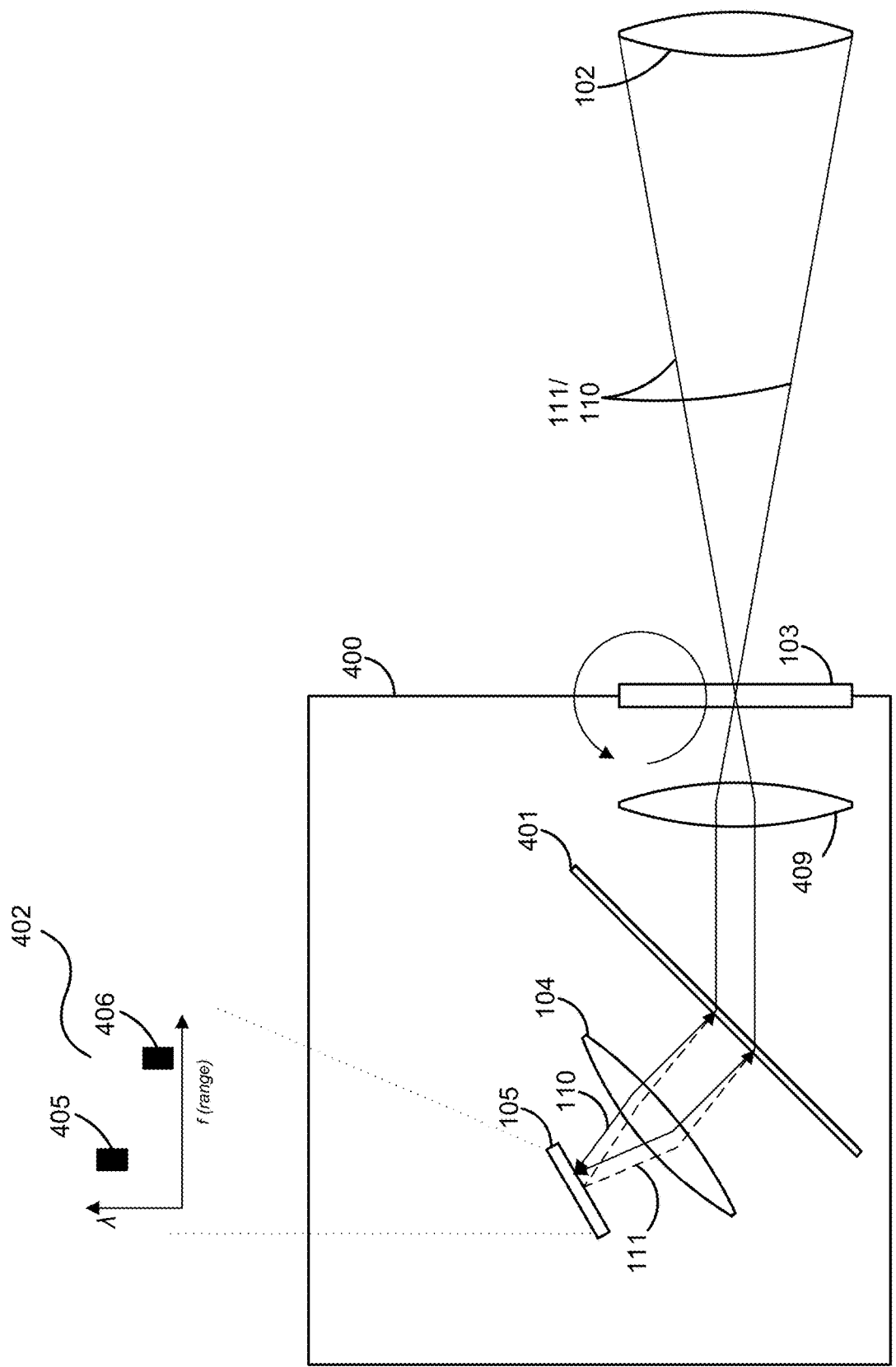
FIGS. 20 and 21 are block diagrams of an exemplary imaging spectrometer employing a tilted image plane.
Figure 21:
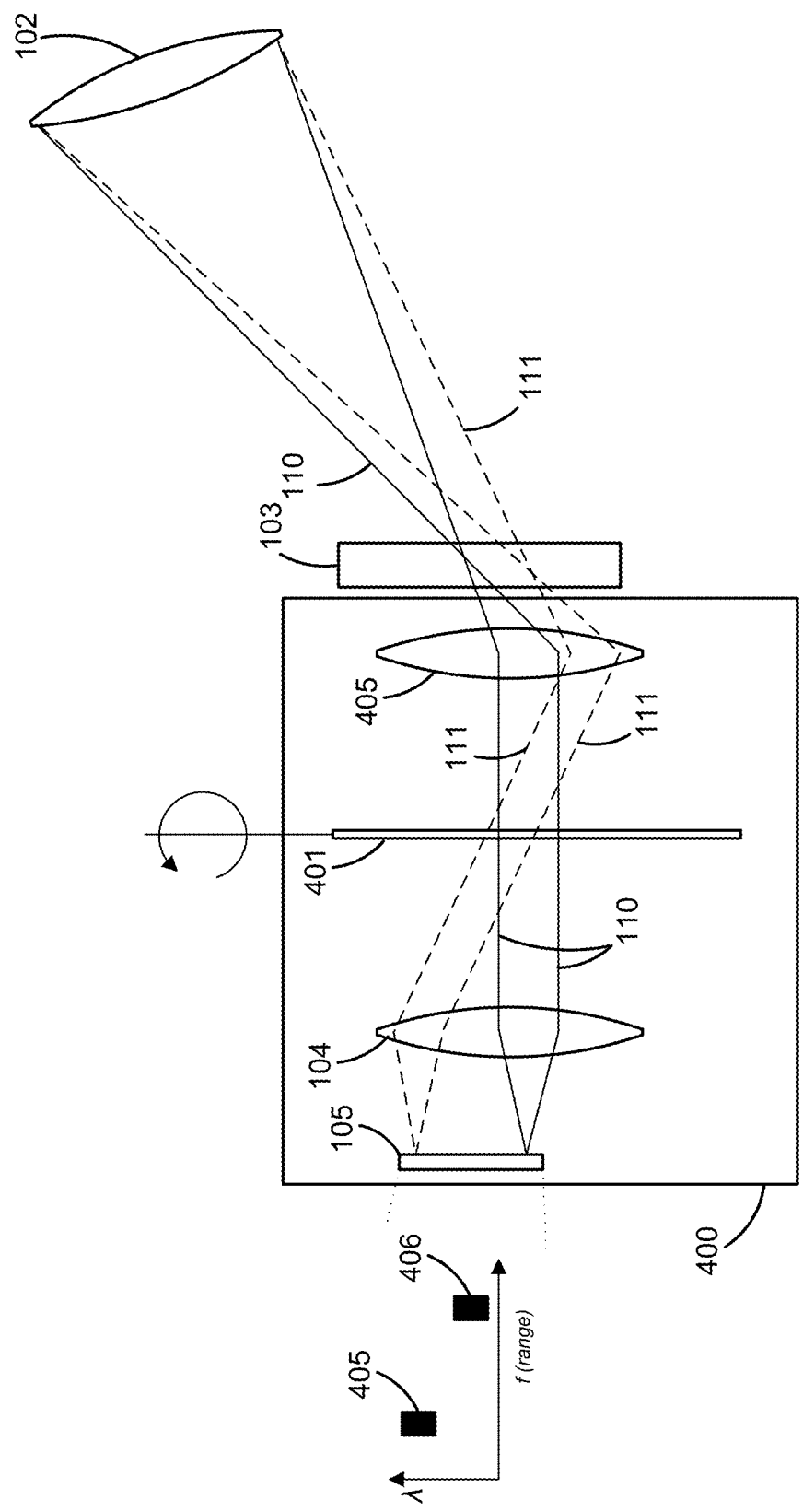

FIGS. 20 and 21 are block diagrams of an exemplary imaging spectrometer employing a tilted image plane. In this embodiment, the imaging spectrometer 400 is implemented with the detector 105 and may be implemented as a variant of a Czerny-Turner spectrometer. The tilted image plane of the spatial filter 103 may be imaged onto a sensing plane such that spectral components of the light emanating from the beam path 109 may be spectrally dispersed in a direction different from the long direction of the aperture of the spatial filter 103. For example, assume that the spectral dispersion is in the direction of the plane of the view for the imaging spectrometer 400 of FIG. 20. The optical axis of the optics 102 is not positioned within that plane. Rather, it is lifted out of that plane, perpendicular to that plane and to that of the tilted image plane. Light exiting the spatial filter 103 is collimated by optics 409 prior to traversing through a transmission grating filter 401. Light from a first diffraction order is then focused by imaging optics 104 to form an image on a plane of the detector 105. At the detector plane, the position of the image provides information about both the spectrum of the collected light and the range at which the light was emitted.

FIG. 21 provides a roughly orthogonal view of this embodiment in which light propagation is illustrated through the system from emissions at two different ranges (e.g., points 107 and 108 along the beam path 109). Light from these two emission points comes to focus at two separate locations on the tilted image plane of the spatial filter 103. The light from these points is collimated by the collimating optics 405, propagated through the grating 401, and then focused on the detector 105 by the imaging optics 104.

The grating 401 may be tilted about a grating axis. For the purposes of this representation, the imaging optics 104 and the detector 105 of the tilted image spectrometer are illustrated in the same plane as the other elements. However, the optical axis of the imaging optics 104 and a normal from the detector are at an angle to the plane of the view. This angle is designed to capture a first-order diffraction light from the grating 401.

The detector 105 may be implemented as an array of time resolved detectors or an imaging array. For example, detectors placed at different positions in the detector plane can gather different spectral components of received emissions. Time resolved detectors may be used to extract range distributions of spectral source components based on a lidar time-of-flight delay. For emission processes that have relatively long timescales, a time-of-flight based range detection may be impractical and the elimination position on a two-dimensional array may be used to obtain the range instead.

Figure 22:
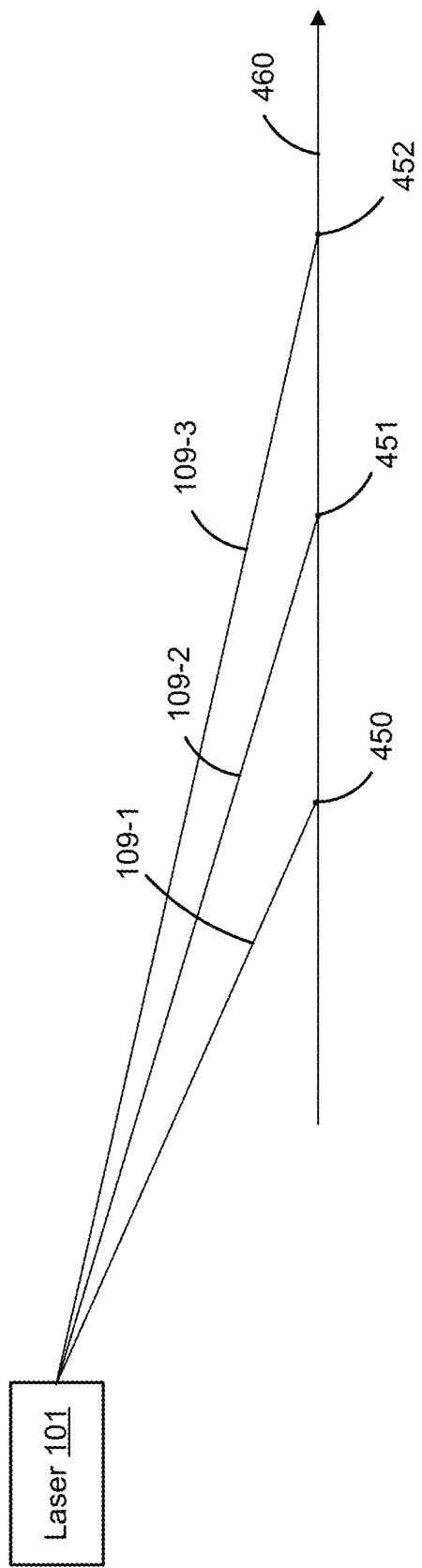
FIG. 22 is a block diagram illustrating an exemplary surface scanning embodiment of a lidar system.

FIG. 22 is a block diagram illustrating an exemplary surface scanning embodiment of a lidar system. Optically, the surface scanning embodiment is similar to the lidar system 100 embodiments above. This embodiment employs an additional scanner to scan the laser within the bistatic plane. The optical system utilizes a tilted image plane to image a line of emissions induced by laser interactions where the optical axis 116 is along a separate, possibly parallel, path.

For example, multiple laser beam paths 109-1-109-3 may intersect an extended surface along a beam emission line 460. This beam emission line 460 is optically the same as a beam emission axis formed by a single laser beam passing through a distributed medium. At each interception point (450, 451, and 452), light is emitted through either linear or nonlinear processes. In this example, the bistatic plane is the plane intercepting the beam emission axis 460 and the imaging optical axis 116. Just as the beam emission axis is formed by a single laser, beam traversing a distributed volume in the above embodiments, the optical system images the multiple beam emission axis onto a tilted image plane.

Though some of the above embodiments have been depicted for a case where a single detector 105 is positioned to receive incoming light traversing the tilted spatial filter 103, it should be understood that the detector 105 may comprise an array of detectors. In fact, the detector 105 may be representative of a detector array that provides multiple detector pixels. The spatial distribution of incoming light at the tilted image plane is, in general, mathematically related to the range dependent distributions of emission sources. Consequently, a detector array may be used to capture the spatial distribution of incoming light near the tilted image plane and additional processing may be performed on the signals obtained from each detector pixel to extract emission spatial distribution data. Spatial data captured from an array of detector pixels may be combined with temporal data from detector pixels to provide improved emission distribution data. For example, the response or gain of pixel detectors located at different positions in close proximity to the tilted image plane may be selected or adjusted to compensate range-dependence in the processes of emissions generation and collection.

Figure 23:
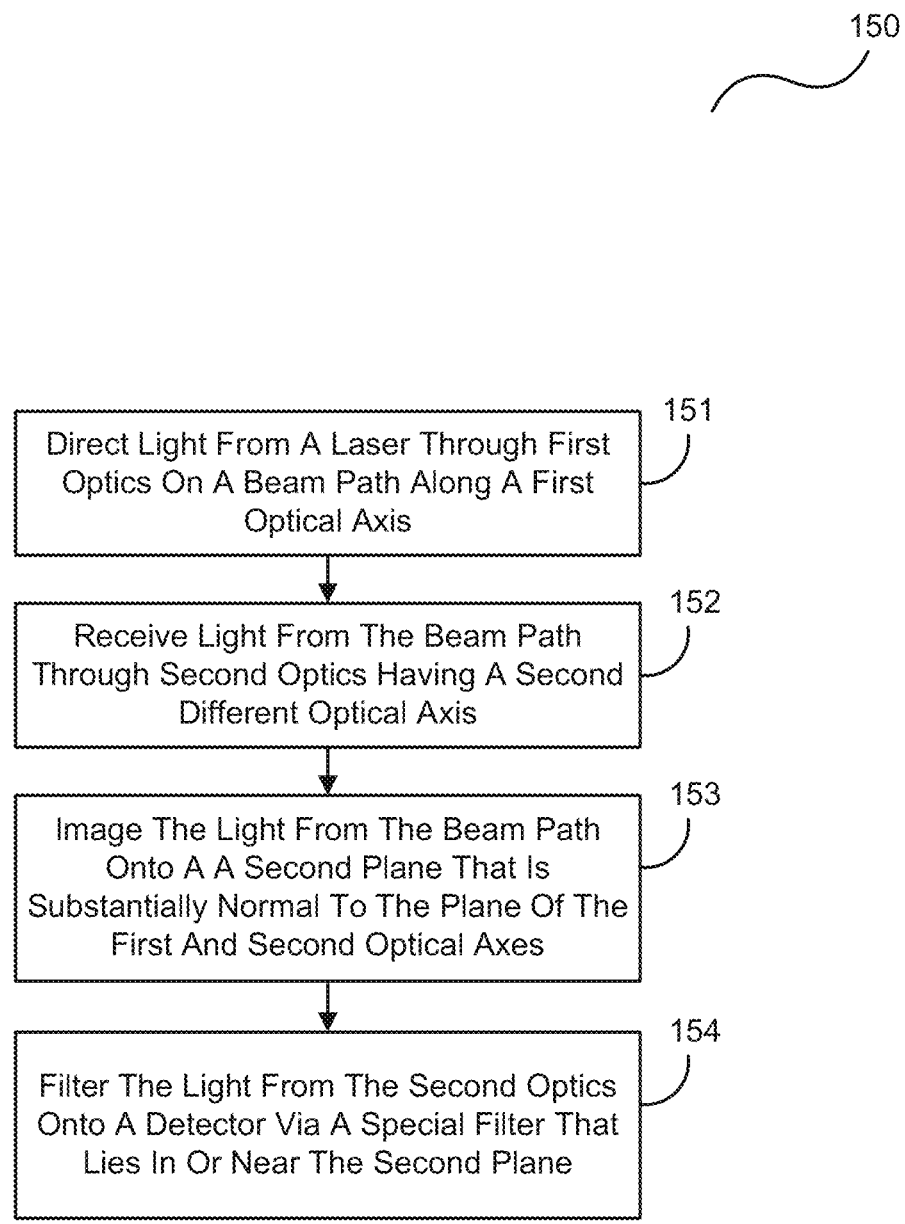
FIG. 23 is a flowchart of an exemplary process of the lidar system of FIG. 1.

FIG. 23 is a flowchart of an exemplary process 150 of the lidar system of FIG. 1. In this embodiment, light is first directed from the laser 101 using first optics on a beam path 109 that coincides with the optical axis of the first optics (e.g., as configured with the laser 101), in the process element 151. Light emitted from the beam path 109 is received through second optics 102 having a second different optical axis 116, in the process element 152. The light is imaged onto a second plane that is substantially normal to the bistatic plane containing the first and second optical axes 109/116, in the process element 153. Again, the first and second optical axes 109/116 lie substantially in the same first plane (e.g., neglecting design tolerances). And, a first line in the first plane intersects a second line in the second plane at an acute angle. The first line is perpendicular to the first optical axis 109. Light projected onto the second plane is then filtered via the spatial filter 103 that lies in or near the second plane, in the process element 154. The filtered light is projected onto the detector 105.

Figure 24:
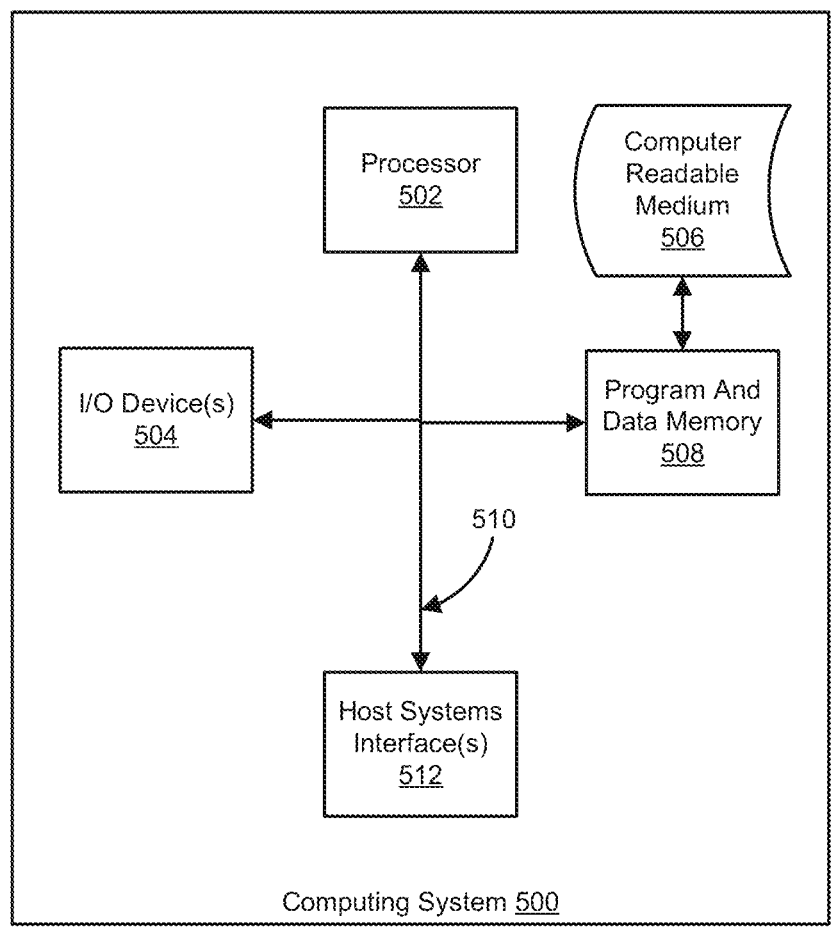
FIG. 24 is a block diagram of an exemplary computing system in which a computer readable medium provides instructions for performing methods herein.

The invention can be embodied in various forms of hardware and software. For example, optical components such as lenses are generally preconfigured "hard" components. However, other optical devices, including lenses may be electronically controlled. In this regard, certain features of the invention may employ various combinations of hardware and software. In one embodiment, such software includes but is not limited to firmware, resident software, microcode, etc. FIG. 24 illustrates a computing system 500 in which a computer readable medium 506 may provide instructions for performing any of the methods and processes disclosed herein.

Furthermore, some aspects of the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A lidar system, comprising:
a laser;
a plurality of detectors;
first optics operable to direct light from the laser on a beam path along a first optical axis of the first optics;
second optics having a second optical axis that differs from the first optical axis and operable to image the light returned from a range extent of the beam path in focus at a same time,
wherein the first and the second optical axes lie in a same first plane, wherein the second optics images the light from the range extent of the beam path onto a second plane comprising the plurality of detectors, wherein the second plane is substantially normal to the first plane, and wherein the detectors are operable to capture a spatial distribution of the light according to a range dependent distribution of emission sources in the beam path.

2. The lidar system of claim 1, wherein:
the plurality of detectors comprises first and second detectors positioned at different locations; and
each of the first and the second detectors receives a unique spectral component from emissions.

3. The lidar system of claim 1, further comprising:
a diffraction grating operable to separate spectral components of the light returned from the beam path.

4. The lidar system of claim 1, further comprising:
a spatial filter configured in or near the second plane to filter the light from the second optics onto the detectors.

5. The lidar system of claim 4, further comprising:
a lens for transmitting light from the spatial filter to the detectors.

6. The lidar system of claim 4, further comprising:
a range response filter proximate to the spatial filter, wherein the range response filter is operable to increase gain to the lidar system by narrowing a field of view.

7. The lidar system of claim 6, wherein:
the range response filter is an opaque shutter blade, a gradient transmission filter, or an electronically controlled spatial light modulator.

8. The lidar system of claim 1, further comprising:
a spatial filter operable to remove near field light returned from the beam path, and to pass far field light returned from the beam path to the detectors.

9. The lidar system of claim 1, further comprising:
a spatial filter operable to attenuate the light returned from the beam path as a function of range along the beam path.

10. The lidar system of claim 1, further comprising:
a spatial filter comprising an aperture that is adjustable based on a range to a target.

11. The lidar system of claim 1, further comprising:
a rotatable scan mirror operable to change a direction of the beam path.

12. The lidar system of claim 1, further comprising:
an optical element comprising one or more vignetting apertures operable to attenuate near range components of the light returned from the beam path.

13. The lidar system of claim 1, wherein:
the light returned from the beam path is generated based on: hard target scattering; Mie scattering; Raleigh scattering; nonlinear elastic scattering; inelastic scattering; parametric processes; Raman scattering; fluorescence; laser induced breakdown; or a combination thereof.

14. The lidar system of claim 1, wherein:
the first optics are operable to direct the light to the beam path by directing the laser to an extended surface containing the beam path.

15. A method operable with a lidar system, comprising:
directing light from a laser through first optics on a beam path along a first optical axis;
receiving light returned from a range extent of the beam path through second optics having a second optical axis that differs from the first optical axis,
wherein the first and the second optical axes lie in a same first plane;
imaging the light from the range extent of the beam path in focus at a same time onto a second plane comprising a plurality of detectors that is substantially normal to the first plane; and
detecting the light returned from the beam path with the plurality of detectors that are operable to capture a spatial distribution of the light according to a range dependent distribution of emission sources in the beam path.

16. The method of claim 15, further comprising:
positioning at least first and second of the plurality of detectors at different locations such that each of the at least first and second detectors receives a unique spectral component from emissions.

17. The method of claim 15, further comprising:
filtering the light from the second optics onto the detectors via a spatial filter that lies in or near the second plane.

18. The method of claim 17, wherein filtering comprises:
removing near field light returned from the beam path; and
passing far field light returned from the beam path to the detectors.

19. The method of claim 15, further comprising:
changing a direction of the beam path via a rotatable scan mirror.

20. A lidar system, comprising:
a laser operable to direct light along a beam path;
an optical element configured in a first plane and having an optical axis that is generally parallel to the beam path;
an array of optical detectors,
wherein the optical element is operable to image a range extent of light returned from one or more emission sources in the beam path in focus at a same time, and
wherein the detectors are configured in second plane that is substantially normal to the first plane and are operable to capture a spatial distribution of the light according to a range dependent distribution of the emission sources in the beam path.

21. The lidar system of claim 20, wherein:
the array of optical detectors comprises first and second detectors positioned at different locations; and
each of the first and the second detectors receives a unique spectral component from emissions.

22. The lidar system of claim 20, further comprising:
a diffraction grating operable to separate spectral components of the light returned from the beam path.

23. The lidar system of claim 20, further comprising:
a spatial filter configured in or near the second plane to filter the light onto the detectors.

24. The lidar system of claim 23, further comprising:
a lens for transmitting light from the spatial filter to the detectors.

25. The lidar system of claim 23, further comprising:
a range response filter proximate to the spatial filter, wherein the range response filter is operable to increase gain to the lidar system by narrowing a field of view.

26. The lidar system of claim 25, wherein:
the range response filter is an opaque shutter blade, a gradient transmission filter, or an electronically controlled spatial light modulator.

27. The lidar system of claim 20, further comprising:
a spatial filter operable to remove near field light returned from the beam path, and to pass far field light returned from the beam path to the detectors.

28. The lidar system of claim 20, further comprising:
a spatial filter operable to attenuate the light returned from the beam path as a function of range along the beam path.

29. The lidar system of claim 20, further comprising:
a spatial filter comprising an aperture that is adjustable based on a range to a target.

30. The lidar system of claim 20, further comprising:
a rotatable scan mirror operable to change a direction of the beam path.

31. The lidar system of claim 20, further comprising:
an optical element comprising one or more vignetting apertures operable to attenuate near range components of the light returned from the beam path.

32. The lidar system of claim 20, wherein:
the light returned from the beam path is generated based on: hard target scattering; Mie scattering; Raleigh scatting; nonlinear elastic scattering; inelastic scattering; parametric processes; Raman scattering; fluorescence; laser induced breakdown; or a combination thereof.

33. The lidar system of claim 20, wherein:
the first optics are further operable to direct the light to the beam path by directing the laser to an extended surface containing the beam path.

34. The method of claim 15, further comprising:
separating spectral components of the light returned from the beam path via a diffraction grating.

35. The method of claim 17, further comprising:
transmitting light from the spatial filter to the detectors through a lens.

36. The method of claim 17, further comprising:
increasing gain to the lidar system by narrowing a field of view via a range response filter configured proximate to the spatial filter.

37. The method of claim 36, wherein:
the range response filter is an opaque shutter blade, a gradient transmission filter, or an electronically controlled spatial light modulator.

38. The method of claim 15, further comprising:
attenuating the light returned from the beam path as a function of range along the beam path via a spatial filter.

39. The method of claim 15, further comprising:
adjustably changing an aperture of a spatial filter based on a range to a target.

40. The method of claim 15, further comprising:
attenuating near range components of the light returned from the beam path via an optical element comprising one or more vignetting apertures.

41. The method of claim 15, wherein:
the light returned from the beam path is generated based on: hard target scattering; Mie scattering; Raleigh scatting; nonlinear elastic scattering; inelastic scattering; parametric processes; Raman scattering; fluorescence; laser induced breakdown; or a combination thereof.

42. The method of claim 15, further comprising:
directing the light to the beam path via the first optics by directing the laser to an extended surface containing the beam path.

* * * * *